US011293806B2

(12) United States Patent
Berlatzky

(10) Patent No.: US 11,293,806 B2
(45) Date of Patent: Apr. 5, 2022

(54) WAVEFRONT SENSOR AND METHOD OF USING IT

(71) Applicant: PXE COMPUTATIONAL IMAGING LTD, Kibbutz Beit Guvrin (IL)

(72) Inventor: Yoav Berlatzky, Kibbutz Beit Guvrin (IL)

(73) Assignee: PXE COMPUTATIONAL IMAGIMG LTD, Kibbutz Beit Guvrin (IL)

( * ) Notice: Subject to any disclaimer, the term of this patent is extended or adjusted under 35 U.S.C. 154(b) by 157 days.

(21) Appl. No.: 16/494,945

(22) PCT Filed: Feb. 7, 2018

(86) PCT No.: PCT/IL2018/050135
§ 371 (c)(1),
(2) Date: Sep. 17, 2019

(87) PCT Pub. No.: WO2018/185740
PCT Pub. Date: Oct. 11, 2018

(65) Prior Publication Data
US 2020/0278257 A1 Sep. 3, 2020

(30) Foreign Application Priority Data
Apr. 6, 2017 (IL) .......................... 251636

(51) Int. Cl.
*G01J 9/02* (2006.01)
*G01J 9/00* (2006.01)
(52) U.S. Cl.
CPC .......... *G01J 9/02* (2013.01); *G01J 2009/002* (2013.01); *G01J 2009/0211* (2013.01)
(58) Field of Classification Search
CPC ................. G01J 9/02; G01J 2009/002; G01J 2009/0211; G01J 9/00; G01B 9/02
See application file for complete search history.

(56) References Cited

U.S. PATENT DOCUMENTS

| | | | | |
|---|---|---|---|---|
| 4,141,652 A | * | 2/1979 | Feinleib | G01J 9/00 250/201.9 |
| 4,682,888 A | * | 7/1987 | Welner | G01J 9/00 356/141.5 |

(Continued)

FOREIGN PATENT DOCUMENTS

| | | |
|---|---|---|
| CN | 1582407 A | 2/2005 |
| CN | 101989049 A | 3/2011 |

(Continued)

OTHER PUBLICATIONS

Espacenet English Translation of JPWO2014196448 also presented as JP6259825 (Year: 2014).*

*Primary Examiner* — Mohamed K Amara
(74) *Attorney, Agent, or Firm* — Dorsey & Whitney LLP

(57) ABSTRACT

An optical detection system for detecting data on the optical mutual coherence function of input field. The system comprising an encoder having similar unit cells, and an array of sensor cells located at a distance downstream of said unit cells with respect to a general direction of propagation of input light. The array defines a plurality of sub-array unit cells, each sub-array corresponding to a unit cell of the encoder, and each sub-array comprising a predetermined number M of sensor elements. The encoder applies predetermined modulation to input light collected by the system, such that each unit cell of said encoder directs a portion of the collected input light incident thereon onto sub-array unit cell corresponding therewith and one or more neighboring sub-array unit cells within a predetermined proximity region. The number M is determined in accordance with a predetermined number of sub-arrays unit cells within the proximity region.

20 Claims, 24 Drawing Sheets

(56) References Cited

U.S. PATENT DOCUMENTS

| | | | | |
|---|---|---|---|---|
| 4,737,621 A * | 4/1988 | Gonsiorowski | G02B 26/06 | 250/201.9 |
| 4,950,878 A * | 8/1990 | Ulich | G01J 9/00 | 250/201.9 |
| 5,410,397 A * | 4/1995 | Toeppen | G01J 9/00 | 356/121 |
| 5,412,200 A * | 5/1995 | Rhoads | G01J 9/00 | 250/201.9 |
| 5,486,927 A | 1/1996 | Koizumi et al. | | |
| 5,604,417 A | 2/1997 | Kaminaga et al. | | |
| 5,606,417 A | 2/1997 | Primot et al. | | |
| 6,382,793 B1 * | 5/2002 | Lai | G01J 9/00 | 351/206 |
| 6,577,403 B1 | 6/2003 | Primot et al. | | |
| 7,826,066 B2 | 11/2010 | Primot et al. | | |
| 8,591,027 B2 * | 11/2013 | Su | G01J 1/0437 | 351/205 |
| 9,420,164 B1 | 8/2016 | Galor Gluskin et al. | | |
| 9,423,306 B2 * | 8/2016 | Bahk | G01J 9/0215 | |
| 9,654,222 B1 | 5/2017 | Shatz | H04M 1/72403 | |
| 9,666,634 B2 * | 5/2017 | Tian | H01L 27/14609 | |
| 10,145,942 B2 * | 12/2018 | Menashe | G01S 7/4911 | |
| 10,203,399 B2 * | 2/2019 | Retterath | G01S 17/10 | |
| 10,247,547 B2 * | 4/2019 | Thuries | G02B 27/0944 | |
| 2002/0118340 A1 * | 8/2002 | Campin | G01M 11/0264 | 351/211 |
| 2003/0085335 A1 * | 5/2003 | Almogy | G01N 21/9501 | 250/208.1 |
| 2004/0042094 A1 * | 3/2004 | Matsuyama | G03F 7/70833 | 359/822 |
| 2004/0227932 A1 * | 11/2004 | Yoon | G01J 9/00 | 356/121 |
| 2006/0165179 A1 * | 7/2006 | Feuer | H04N 7/01 | 375/240.18 |
| 2007/0247698 A1 * | 10/2007 | Yoon | G01J 9/00 | 359/277 |
| 2008/0187305 A1 * | 8/2008 | Raskar | G02B 27/0075 | 396/268 |
| 2008/0266655 A1 * | 10/2008 | Levoy | G02B 21/367 | 359/368 |
| 2009/0185132 A1 * | 7/2009 | Raymond | A61B 3/1015 | 351/205 |
| 2009/0218514 A1 * | 9/2009 | Klunder | G01N 21/6452 | 250/459.1 |
| 2009/0273843 A1 * | 11/2009 | Raskar | G02B 27/0018 | 359/601 |
| 2011/0174998 A1 | 7/2011 | Molnar et al. | | |
| 2011/0193956 A1 | 8/2011 | Gilg et al. | | |
| 2011/0298912 A1 * | 12/2011 | Jelinek | A61B 5/1171 | 348/78 |
| 2012/0162457 A1 * | 6/2012 | Veeraraghavan | H04N 5/23225 | 348/222.1 |
| 2012/0263274 A1 | 10/2012 | Ouchi | | |
| 2012/0268717 A1 * | 10/2012 | Zhou | G01J 9/00 | 351/221 |
| 2013/0092816 A1 * | 4/2013 | Barrett | G01J 9/00 | 250/201.9 |
| 2013/0107196 A1 * | 5/2013 | Rossini | G01J 9/00 | 349/199 |
| 2014/0233697 A1 | 8/2014 | Ignatyev et al. | | |
| 2014/0267674 A1 * | 9/2014 | Mertz | G02B 21/361 | 348/79 |
| 2014/0334745 A1 * | 11/2014 | Fleischer | G06T 3/4061 | 382/284 |
| 2015/0073752 A1 * | 3/2015 | Ohkubo | G01J 9/02 | 702/189 |
| 2015/0253197 A1 | 9/2015 | Okamoto et al. | | |
| 2015/0293228 A1 | 10/2015 | Retterath et al. | | |
| 2015/0300885 A1 * | 10/2015 | Bahk | G03F 7/706 | 356/521 |
| 2015/0355470 A1 * | 12/2015 | Herschbach | F21V 5/08 | 362/11 |
| 2015/0357360 A1 | 12/2015 | Tian et al. | | |
| 2016/0005179 A1 | 1/2016 | Petyushko et al. | | |
| 2016/0061656 A1 | 3/2016 | Awatsuji et al. | | |
| 2016/0109290 A1 * | 4/2016 | Klennert | G02B 27/1006 | 356/416 |
| 2016/0109700 A1 | 4/2016 | Huang et al. | | |
| 2016/0124221 A1 | 5/2016 | Huang et al. | | |
| 2016/0124222 A1 | 5/2016 | Huang et al. | | |
| 2016/0131901 A1 | 5/2016 | Huang et al. | | |
| 2016/0195429 A1 | 7/2016 | Boettiger | | |
| 2016/0225805 A1 | 8/2016 | Keelan et al. | | |
| 2016/0241772 A1 | 8/2016 | Johnson | | |
| 2016/0286108 A1 | 9/2016 | Fettig et al. | | |
| 2016/0377414 A1 * | 12/2016 | Thuries | G02B 27/1093 | 356/625 |
| 2017/0059446 A1 * | 3/2017 | Maeda | G01M 11/025 | |
| 2018/0203248 A1 * | 7/2018 | op 't Root | G03F 7/7055 | |
| 2019/0257987 A1 | 8/2019 | Saari et al. | | |
| 2020/0088579 A1 * | 3/2020 | Balas | G01J 3/32 | |
| 2021/0211644 A1 | 7/2021 | Su et al. | | |

FOREIGN PATENT DOCUMENTS

| | | |
|---|---|---|
| CN | 203163728 U | 8/2013 |
| CN | 104068875 A | 10/2014 |
| CN | 105115417 A | 12/2015 |
| CN | 105264428 A | 1/2016 |
| DE | 19800844 A1 | 7/1999 |
| EP | 2833107 A2 | 2/2015 |
| EP | 2982946 A1 | 2/2016 |
| JP | H05268059 A | 10/1993 |
| WO | 2007092545 A2 | 8/2007 |
| WO | 2014196448 A1 | 12/2014 |
| WO | 2014196449 A1 | 12/2014 |
| WO | 2014196450 A1 | 12/2014 |
| WO | 2015198331 A1 | 12/2015 |
| WO | 2019109182 A1 | 6/2019 |

* cited by examiner $n_R$

WAVEFRONT SENSOR AND METHOD OF USING IT

TECHNOLOGICAL FIELD

The present invention relates to imaging systems and methods providing data indicative of input field properties. The technique is particularly relevant for use in imaging enabling reconstructions of the mutual coherence function of the input field.

BACKGROUND

Optical imaging plays a great role in various measurement, inspection and imaging systems. Currently available optical measurement and imaging techniques can provide high resolution data about the intensity of input optical field. However, a great portion of the information carried by the optical field is lost in typical conventional imaging techniques that measure only of the intensity of the field.

Various techniques are known, enabling extraction of at least some additional information carried by the optical field. The use of a reference beam or self-interference may enable certain level of phase or coherence measurements of light, but may be sensitive to environmental decoherence effects. Additional techniques aim to provide data about the light field with certain spatial resolution such as light field and plenoptic imaging techniques, but are typically limited to sub-diffraction limited.

Additional techniques are known providing certain spatial resolution of phase information, for example:

U.S. Pat. No. 5,606,417 describes a device for analyzing the wave surface of a light beam that has an entry lens which defines a reference plane, optically conjugate with the plane in which the wave surface of the light beam is analyzed. A bi-dimensional meshed lattice is placed in this reference plane, perpendicularly to the beam. The different sub-beams, due to the different orders of diffraction, are focused jointly by a first lens, in an intermediate focal plane in the vicinity of which a mask selects, from the sub-beams, those which relate to at least three distinct orders of diffraction. A second lens takes the selected sub-beams to a nil-sensitivity plane, conjugate with the plane of the lattice. An interference image is observed in a working plane, situated at a chosen distance from the nil-sensitivity plane. The device can be characterized as an improved achromatic optical interferometer, of the trilateral shift type.

U.S. Pat. No. 6,577,403 describes a technique analyzing the wavefront of a light beam. In the process, a diffraction grating with rectangular meshing is placed in a plane perpendicular to the light beam to be analyzed and optically conjugate with the analysis plane. Different emergent beams from the grating interfere to form an image whose deformations are related to the slopes of the wavefront analyzed. The grating multiplies an intensity function, implemented by a two-dimensional intensity grating, which defines a rectangular meshing of sub-pupils transmitting the light from the beam to be analyzed into a plurality of emergent beams disposed in accordance with a rectangular meshing, with a phase function implemented by a two-dimension phase grating which introduces a phase shift between two adjacent emergent beams such that the two emergent beams are in phase opposition.

U.S. Pat. No. 7,826,066 describes a method and a system for analyzing the wavefront of a light beam, wherein a diffraction grating is arranged in a plane perpendicular to the light beam to be analyzed and optically conjugated to the analysis plane. Different emerging beams of the grating interfere to generate an image having deformations linked to the gradients of the wavefront to be analyzed. The method is characterized in that the grating carries out the multiplication of an intensity function which is implemented by a two-dimensional grating with hexagonal meshing of surface S transmitting the light of the beam to be analyzed into plural emerging beams arranged in a hexagonal meshing, by an phase function which is implemented by a two-dimensional grating with hexagonal meshing of surface 3S which introduces a phase shift close to $2\pi/3$ (modulo $2\pi$) between two adjacent secondary beams.

US 2016/109700 describes an adaptive optics system including a spatial light modulator configured to spatially modulate a phase of an optical image incident on a modulation surface and a wavefront sensor including a lens array having a plurality of two-dimensionally arranged lenses and an optical detection element for detecting a light intensity distribution including converging spots formed by the lens array and configured to receive the optical image after the modulation from the spatial light modulator, and compensates for wavefront distribution by controlling a phase pattern displayed in the spatial light modulator based on a wavefront shape of the optical image obtained from the light intensity distribution, wherein an amount of angular displacement between the modulation surface and the wavefront sensor is calculated.

GENERAL DESCRIPTION

There is a need in the art for a sensor system and corresponding technique for detecting input optical field enabling high level information about at least one of phase and coherence distributions of the optical field, generally in addition to the intensity distribution.

Generally, as indicated above, optical sensor technology can provide high accuracy and high-resolution data about the intensity distribution of an input optical field. However, additional data that might be hidden in the phase distribution of the optical field is typically lost in the process of detection.

Detection of the additional phase and/or coherence information carried by collected optical fields can be used for compensating for effects of a collection system, such as various aberrations introduced by lenses. The phase and/or coherence information may also be used for compensation for depth of focus of the optical system, as well as enable combining image data pieces (images) forming large synthetic apertures. Additionally, data about phase and/or coherence of collected optical field may be used in lens-less imaging techniques, e.g. using non-optical electromagnetic radiation. Further, the phase and coherence data may be used to perform quantitative optical phase tomography, optical profilometry, three-dimensional depth detection and measurement, as well as optical diffraction tomography to recover the three-dimensional refractive index distribution associated with an object being imaged. It should be noted that detection of phase and/or coherence mapping of collected electromagnetic radiation may also include detection of intensity information of the collected radiation.

In this connection, it should be noted that the present technique, as described herein below, relate to detector system and corresponding method for determining data about the phase and coherence distribution of collected electromagnetic radiation of one or more predetermined wavelength range. Generally, field information such as phase, coherence and intensity distribution of the electromagnetic (e.g. optical) field are part of the optical mutual coherence function (generally referred to as mutual coherence). The technique of the present invention is generally suitable for detection of at least an approximation of the mutual coherence, providing certain level of phase and/or coherence data in accordance with selected resolution for detection and reconstruction. The term optical field is used herein for simplicity and should be understood broadly as relating to electromagnetic radiation, which may or may not be within the conventional optical wavelength spectrum. More specifically, while the conventional optical spectrum typically relate to visible light, with near infra-red and certain range of ultra-violet wavelength, the technique of the present invention may also be used for detection of phase and coherence data associated with additional wavelength ranges including, but not limited to, long wave infra-red, infra-red radiation, visible light, ultra-violet radiation as well as x-ray and gamma radiations and generally any frequency range of electromagnetic radiation. Thus, the terms optical field, optical radiation, light, as well as electromagnetic radiation or electromagnetic field are used herein interchangeably and relate in general to electromagnetic fields.

The present invention provides an optical detection system configured for detecting input optical field to provide data about the input field's mutual coherence, which may include data about phase and/or coherence distributions of the input field, and may also be used for providing intensity data of the input field. The optical detection system comprises an optical encoder unit, or encoder, having a periodic pattern defining a plurality of unit cells and an array of sensor cells located at a predetermined distance downstream of the encoder with respect to general direction of propagation of collected input light. The encoder is configured to introduce predetermined modulation to collected light and direct the so-modulated light toward the sensor array. Generally, the encoder and sensor array are aligned between them such that for each unit cells of the encoder, there is an associated sub-array of sensor cells comprising one or more sensor cells. However, this correspondence of sensor sub-array and unit cells of the encoder is typically not tight. More specifically, the encoder is configured to direct light components passing therethrough into one or more diffraction orders (referred herein also as sub-channels), thus introducing cross-talk between the sensor sub-arrays and unit cells of the encoder. Accordingly, some light components passing through a unit cell of the encoder are directed to sensor cells associated with other unit cells, being neighbor, next neighbors, or further. This provides certain level of interference between light components associated with different unit cells of the encoder, providing spatial data about coherence and phase relation of the input collected light as will be described in more details further below.

It should be noted that the encoder may be formed of one or more layers providing a multi-layer or cascade structure encoder, each layer is configured for applying one or more selected patterning to light passing therethrough. Further, the different layers may apply various types of pattern effectively modulating/manipulating light transmitted therethrough. As described in more details further below, such patterning/modulating/manipulating may be applied using one or more diffractive elements, pinholes, phase varying mask, amplitude varying mask, refractive structure (e.g. lenslets, micro-prisms), and/or a combination of such modulating elements.

Generally, the encoder defines a detection plane of the optical detection system, as well as the geometrical resolution of detection. More specifically, each unit cell of the encoder relates to a data point (data element or pixel) of image data generated by the detector system. According to the invention, the data associated with such pixel may include at least intensity and (typically relative) phase of light components arriving at the corresponding unit cells. Accordingly, the size of unit cells of the encoder may preferably be determined in accordance with the desired geometrical resolution of detection. Preferably, the unit cells of the encoder are configured to enable a sufficient sampling rate (at least Nyquist) of the collected input optical field, such that pixel size corresponds to the diffraction limited spot of collected light incident on the encoder input plane, i.e. about $\lambda/(4NA)$ along each axis thereof.

The optical detection system may generally also comprise, or be connectable to, a control unit. The control unit is configured for receiving data about collected light from the array of sensor cells and for processing the received data in accordance with pre-stored data about the effective response of the encoder to determine data about intensity and phase distribution as well as data about mutual coherence distribution of the collected light.

The control unit may comprise a processing utility (e.g. one or more processors) and a storage utility, and be configured for receiving input data indicative of collected intensity map from the detector array, and for processing said input data to provide data about at least one of phase and coherence of collected light. Generally, the storage utility may be pre-loaded with data about response of light components passing through the encoder, e.g. response function of one or more encoder unit cells. The processing utility may utilize this pre-loaded data for processing the input data about the intensity map and determining data about mutual coherence matrix of collected light.

Accordingly, the processing may utilize determining a mutual coherence matrix of input optical field by processing input data associated with intensity map provided by the array of sensor cells, in accordance with data about encoder's modulation of one or more predetermined input light field functions. Utilizing properly selected representation of the modulation by the encoder, and/or properly selected input light field functions provides substantially linear transformation between the intensity map data and the mutual coherence of any given input light field. Such linear transformation may be provided by a set of basis vectors/functions as described herein utilizing intensity- and coherence-basis functions which may be determined and/or pre-provided and stored in an accessible storage utility. Generally, the pre-stored data may include data about fundamental response function of light passing through a unit cell of the encoder. The fundamental response function comprises data about amplitude and phase distribution of light propagating from the encoder toward the detector array. The data about fundamental response function may be pre-processed for determining data about a set of "coherence basis functions" acting as set of basis vectors that span the space of possible mutual coherence matrices to be collected by the detection system. The coherence basis functions are complemented by a set of "intensity basis functions", which is a set of predetermined intensity patterns, where each such intensity pattern is given by the intensity of the optical field of each corresponding coherence basis function as it propagates through the optical encoder and impinges on the detector array. In some implementations, the coherence basis functions and corresponding intensity basis functions may be pre-computed or pre-measured and stored in the storage utility while not requiring additional data on the fundamental response function.

Generally, the processing utility is configured and operable for determining a set of coefficients associated with weighted linear sum of the intensity basis functions resulting in the collected intensity map. The so-determined set of coefficients defines in accordance with the selected set of coherence basis functions, an estimated mutual coherence matrix of collected light.

Thus, according to one broad aspect, the present invention provides an optical detection system comprising an encoder having a plurality of similar unit cells, and an array of sensor cells located at a distance downstream of said unit cells with respect to a general direction of propagation of input light through the system, wherein:

said array of sensor cells defines a plurality of sub-array unit cells, each sub-array corresponding to a unit cell of said plurality the unit cells of the encoder, and each sub-array comprising a predetermined number M of sensor elements;

said encoder is configured to apply predetermined modulation to input light collected by the optical detection system, such that each unit cell of said encoder directs a portion of the collected input light incident thereon onto sub-array unit cell corresponding therewith and one or more neighboring sub-array unit cells within a predetermined proximity region; and said predetermined number M is determined in accordance with a predetermined number of sub-arrays unit cells within the predetermined proximity region.

According to some embodiments the predetermined number M of sensor elements of the sub-array unit cells may be selected to satisfy a condition that ($M \geq 2n_R+1$), where $n_R$ is said predetermined number of neighboring sub-arrays unit cells within the predetermined proximity region. Additionally or alternatively, the predetermined number M of sensor elements of the sub-array unit cells is selected in accordance with predetermined number of coherence matrix basis functions selected for use in reconstruction of mutual coherence information of the collected input field.

Additionally or alternatively, according to some embodiments, an arrangement of said unit cells of the encoder may define a discretized unit measure of the collected light, a physical dimension of said unit cell of the encoder is defined by predetermined requirements with respect to a diffraction limited spot of light collected by detection system. The physical dimension of the unit cell may smaller than the requirement for the diffraction limited spot. In some embodiments, the physical dimension of the unit cell may be about 0.1-0.25 of the diffraction limited spot. It should generally be noted that the diffraction limited spot size may be determined in accordance with wavelength of collected radiation as well as parameters such as numerical aperture of an optical arrangement that may be used together with the detection system.

According to some embodiments, the encoder may be configured for collecting and encoding light of one or more selected wavelength range. The encoder may be configured to apply predetermined modulation to input light within a predetermined wavelength range such a modulation functions thereof being substantially similar for a selected wavelength range. Alternatively or additionally, the encoder may be configured to apply one or more predetermined modulations to input light within a set of one or more wavelength ranges that said encoder defines a modulation function for each wavelength range within said set.

The array of sensor cells may comprise sensor cells configured for detecting light intensity of two or more wavelength ranges separately. For example, the array of sensor cells may include sensor elements dedicated for specific wavelengths, e.g. using a wavelength selective filter, and/or sensor elements configured to provide hyperspectral radiation detection.

The detection system may further comprise a control unit, the control unit may generally be configured and operable for receiving input data collected by the array of sensor cells and processing said input data in accordance with data about modulation function of said encoder to determine data indicative of mutual coherence of input light collected by the encoder.

The control unit may be configured and operable for determining, in accordance with pre-provided data about modulation function of said encoder, a set of coefficients providing intensity patterns associated with data collected by the array of sensor cells, and for utilizing said set of coefficients to determine mutual coherence of input light collected by the encoder being an algebraic sum of predetermined coherence basis functions having said set of coefficients.

The control unit may comprise a processing utility, storage utility and input port for receiving data about collected intensity map from the array of sensor cells; said storage utility is pre-loaded with data indicative of modulation function of light components passing through one or more unit cells of the encoder; said processing utility is configured and operable for receiving said data about collected intensity map and for processing said data in accordance with said data about modulation function of light components passing through one or more unit cell of the encoder for determining data about coherence matrix of collected light.

According to some embodiments, stored data about modulation function of said encoder may comprise a set of wavelength modulation functions associated with a corresponding set of selected wavelength ranges differently modulated by said encoder.

Generally, the encoder may comprise a mask unit having at least one of phase or amplitude periodic pattern. The encoder may further carry phase and amplitude pattern.

According to some embodiments, the encoder may comprise at least one of micro lens array, micro-prism array grating or phase mask; having said selected periodicity.

The encoder may comprise, or be formed by, two or more layers, each layer comprises a periodic pattern configured for affecting light components passing therethrough. The two or more layers may be separated between them a predetermined distance along general direction of propagation of input light through the system.

In some embodiments, the encoder may comprise a cascaded arrangement of light directing elements.

In some embodiments, the encoder may further comprise an optical relay unit configured for enabling light propagation between said encoder toward said array of sensor cells. Such optical relay unit may be configured to apply predetermined magnification to collected light components.

According to some embodiments, the detector system may comprise a plurality of a predetermined number of encoders having selected patterns between them, and wherein said array of sensor cells being configured for separately collecting optical radiation transmitted through said plurality of encoders; wherein said plurality of encoders being arranged for collecting a plurality of replications of input optical field. Additionally or alternatively, the difference between the encoders may be associated with propagation distance of light toward the corresponding arrays of sensor cells. Pitch periodicities of said plurality of encoders may be selected to be integer multiples of a predetermined periodicity defining arrangement of the plurality of unit-cells, said plurality of encoders being configured so that patterns of different encoders are shifted between them with respect to collected optical field in fractions of said predetermined periodicity, such that a cumulative pattern of said plurality of encoders matches said predetermined periodicity defining the arrangement of unit cells.

According to some embodiments, the encoder may be configured for temporally varying pattern and/or propagation distance to sensor array thereof. The encoder may thus carry a periodic pattern having a pitch periodicity being an integer multiple of predetermined pitch periodicity defining arrangement of the plurality of unit-cells, said encoder being configured for temporally varying pattern thereof by shifting pattern thereof in fractions of said pitch periodicity, wherein said fractions match said predetermined pitch periodicity of the unit cells.

In some embodiments, unit cells of the encoder may be arranged in a plurality of similar clusters, each cluster comprises cells associated with corresponding with at least one of: variation of wavelength selective filtering, variation in polarization orientation, variation in encoder modulation and encoder orientation.

According to one other broad aspect, the present invention provides a method for use in optical detection, the method comprising:

collecting input optical radiation though an encoder at a collection plane and applying to the collected input optical radiation a periodic modulation configured of a plurality of similar unit cells, each having a predetermined modulation function expanding at least a portion of the optical radiation impinging on the unit cell to a downstream predetermined proximity region;

providing an array of sensor cells at a selected distance from said collection plane, said array of sensor cells is configured with cell geometry and arrangement providing a plurality of sub-array unit cells each comprising a predetermined number M of sensor cells and corresponding with unit cell of the encoder while being configured for collection of light components associated with one or more of said predetermined number of neighboring unit cells determined in accordance with said proximity region, and generating intensity map associated with output of said array of sensor cells in response to collected optical radiation;

processing said intensity map in accordance with data about said predetermined modulation function for determining a mutual coherence function of the collection light.

According to some embodiments, the above described processing may comprise obtaining pre-stored data indicative of said modulation function in the form of a set of intensity basis functions, associated with a corresponding set of coherence basis functions, and determining a set of coefficients connecting weighted sum of said set of intensity basis functions with said intensity map, and determining said mutual coherence matrix in accordance with said set of coefficients and said set of coherence basis functions.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
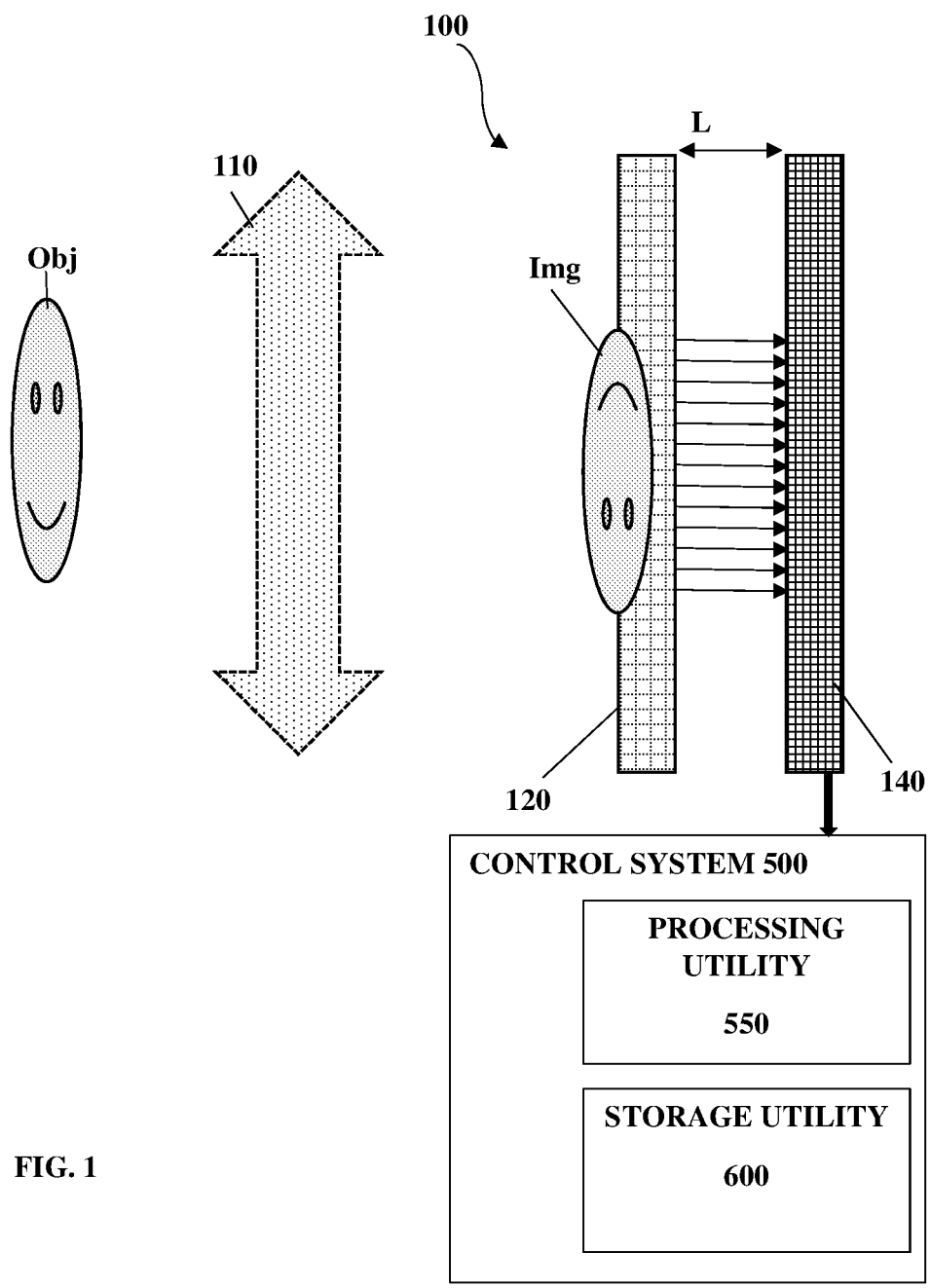
FIG. 1 illustrates imaging configuration utilizing a detection system according to some embodiments of the present invention.

As indicated above, the present invention provides a system and technique capable of providing data indicative of light field properties at a desired spatial resolution. Reference is made to FIG. 1 schematically illustrating a system 100 configured as optical detection system for detection of light field phase, coherence and intensity data. The optical detection system 100 includes an encoder 120 and a detector array 140 located at predetermined distance L downstream of the encoder 120 with respect to general direction of radiation propagation. It should be noted that in some embodiments of the invention, the encoder 120 may be a separate unit from the detector array 140, while in other embodiments, the encoder 120 may be monolithically integrated with the detector array 140, and even be part of the process stack used to manufacture the sensor array, e.g. using metallization process steps, and/or process steps similar to those used in manufacturing micro-lens arrays typically used to improve pixel fill-factors in sensor arrays.

More specifically, FIG. 1 illustrates imaging of an object Obj using an imaging lens arrangement 110 onto the detection system 100, such that an image Img is formed on an imaging plane defined by the encoder 120 of the system 100. It should be noted that the detector system 100 may also be configured as a stand-alone detection system configured for use while not being associated with imaging lens arrangement, and may thus be used for lens-less imaging without any use of an imaging lens arrangement 110. However, the imaging lens arrangement 110 may be associated with the detection system 100 in the meaning that geometric resolution of the detection system is preferably matched to optical resolution of the imaging lens arrangement 110, also relating to diffraction limited spot size as known in the art.

Additionally, the detection system 100 may be inserted at various points in an optical system that are not necessarily the object's image plane, e.g. it may be inserted at a conjugate plane to obtain a "Bertand" pupil image that includes data on the mutual coherence that may provide mappings of the phase and/or coherence of the electromagnetic field, and may also include data on intensity mapping of the field. It should be noted that such intermediate plane imaging may be used at any selected plane being image plane, Fourier plane or any other intermediate plane. The detection system 100 may also be used to determine mutual coherence data including phase and/or coherence distribution, and typically also intensity data, of a light beam, e.g. laser beam quality monitoring, measurement of aberrations of optical components, measurement of aberrations in a turbulent optical medium (with or without a "guide star"). In such applications, the collected mutual coherence data, including data on phase and/or coherence and possibly also intensity, gathered by the detection system 100 can be further used to perform beam-correction using adaptive optics, and/or digital image processing to minimize the effect of aberrations and/or turbulence.

Typically, the detection system 100 may also include, or be connectable with a control system 500 configured for receiving input data associated with radiation detected by the detector array 140 and for processing the received input data in accordance with data about optical encoding (patterning, light modulation) of the encoder to determine data about input mutual coherence, including phase and/or coherence distribution, and possibly intensity, of radiation collected by the detection system 100. Such data about the input radiation collected by the detection system 100 may be used for analysis of the object Obj being imaged utilizing phase and/or coherence data of the collected optical field. The data determined by the detector system 100 of the invention may be used reconstruction of the collected optical field and may for example be used various application including, but not limited to, one or more of the following: optical profilometry, three-dimensional depth sensing, detection and measurement; quantitative phase imaging and tomography; optical diffraction tomography for three-dimensional mapping of objects and refractive index thereof; correction of aberrations, e.g. and limitations of the imaging lens arrangement 110 (when used), aberration associated with imaging through turbid media (biological tissue, atmospheric turbulence etc.); aperture synthesis to increase an imaging system's spatial resolution; lens-less imaging; digital refocusing to a different imaging plane.

It should be noted that the technique of the present invention, and the detector system 100 thereof, is generally not limited with respect to characteristics of illumination used for the purposes of imaging. More specifically, the detector system 100 described herein enables detection of mutual coherence data, including data on phase and/or coherence and possibly also intensity of collected input optical field, where an illumination source providing the optical field may be coherent, incoherent or partially coherent, or associated with ambient light or light formed by any selected source, e.g. structured illumination. Typically, the present technique may be further used for determining phase/coherence and possibly also intensity data associated with input optical field formed by non-linear optical effects, e.g. fluorescence, multi-photon processes, etc.

As indicated above, the input plane of the encoder 120 defines a main plane that acts as detection plane of the detection system 100. Further, the encoder 120 includes a periodic pattern configured to apply predetermined modulation to light passing therethrough and direct the so-modulated light toward the array of sensor cells 140. Generally, the encoder 120 and the periodic pattern thereof are configured with a plurality of unit cells arranged in certain selected periodicity along two major axes thereof. More specifically, the periodic pattern may be defined by unit cells having at least two basis vectors $h_1$ and $h_2$, which may be perpendicular (being $h_x$ and $h_y$ vectors) defining a rectangular or square unit cell, or have certain angle between them defining another lattice periodicity. For simplicity, the following is described for rectangular lattice structure (i.e. using $h_x$ and $h_y$ basis vectors). It should however be understood that the technique of the present invention may be implemented using any other lattice structures as described in more details further below.

Each of the unit cells of the encoder 120 is configured to apply certain predetermined coding to optical radiation passing therethrough. Such coding may be associated with an amplitude and/or phase modulation as well as refraction and/or diffraction of light as will be exemplified further below. In some embodiments, the coding of each unit cell may be associated with one or more apertures, phase modulation, intensity modulation, one- or two-dimensional grating and in some embodiments, one or more micro-lens arrays. Generally, the present technique utilizes data about the coding carried by each of the unit cells of the encoder 120 in the form of fundamental response data, and/or corresponding coherence and intensity basis functions, associated with propagation of optical field passing through a single unit cell and propagating toward the detector array 140.

To this end it should be noted that light passing through the encoder and modulated thereby may be considered in accordance with modulation function of a unit cell, and/or in view of the encoder as a periodic pattern including a plurality of unit cells. Thus, the optical modulation performed by the encoder is equally well described using the phase and amplitude of each diffraction order resulting from the periodic pattern of plurality of unit cells as it is described by modulation of each unit cell by itself. Both descriptions of the modulation of light passing through the encoder are used herein interchangeably, to simplify understanding.

Additionally, periodicity of the encoder pattern effectively defines discretization of detection of the input optical field, typically associated with digital detection and representation of collected data. Thus, the unit cells of the periodic pattern define pixel components of detection in a similar manner to detector elements of a CCD array. To this end, physical size and number of the unit cells of encoder 120 define geometrical resolution of detection. Preferably, the physical size of each unit cell may be associated with size of a diffraction limited spot of light collection, e.g. defined by λ(4NA) along one axis, where λ is the wavelength of electromagnetic (optical) radiation and NA is the numerical aperture of the associated imaging lens arrangement 110 (when used), as projected onto the detection system 100. In this connection, it should be noted that the imaging lens arrangement may or may not be an inherent part of the detection system 100 according to the present invention. However, optimization design of the detection system 100, may preferably consider certain parameters of optical imaging arrangement that may be associated thereto to optimize detection accuracy and resolution.

In this connection, it should be noted that the plurality of the unit cells on the encoder 120, and/or of the detector elements of the detector array 140, may be arranged in clusters to provide detection including various different characteristics of the input field. For example, the clusters may be configured for providing imaging including one or more of the following: multi-wavelength and/or polarization sensitive phase/coherence imaging, as well as measuring elements of the mutual coherence function in multiple orientations. Generally, the use of a 1 d encoder within the unit cells simplifies the system's configuration by enabling reduced number of sensor cells used for each unit cell. Accordingly, proper clustering of unit cells having 1-dimensional encoders along different axes may enable detection of various orientation components of the coherence matrix with a simplified detection system configuration. To this end the unit cells may be arranged in clusters, each cluster includes unit cells associated with corresponding wavelength and/or polarization filters. Generally, the unit cell clusters are configured to be associated with imaging resolution with respect to diffraction limited spot and/or Nyquist sampling rate. For example, the unit cell clusters may be arranged in the form of Bayer filter, e.g. providing RGB wavelength encoding, or include polarization filter with varying orientations with or without wavelength filters. Alternatively, or additionally, sensor cells of the detector array 140 may be arranged in clusters, e.g. forming a polychromatic detector array using Bayer filter. Such arrangement of the unit cells and/or the sensor cells may enable increased dynamic range and flexibility, as well as allow additional functionalities such as polychromatic or polarization sensitive phase detection. Generally, an array of clustered unit cells may be associated with three RGB regular imaging cells and a coherence sensitive cell according to the present technique. In such configurations neighboring clusters may be coupled by shared sub-channels enabling detection of phase and/or coherence information.

The detector array 140 includes an array of sensor cells having geometry and arrangement that provides a plurality of sub-arrays of sensor cells, each associated with a corresponding unit cell of the encoder 120 pattern. Generally, each sub-array of sensor cells includes a predetermined number M of sensor cells, each configured for detection of intensity measure of electromagnetic radiation (e.g. light) of predetermined wavelength range impinging thereon. The detector array 140 is configured for collecting of input radiation and generating corresponding intensity distribution data accordingly. The so-generated intensity distribution data is generally transmitted from the detector array to a control unit 500 where it may be processed for determining data about intensity, phase and coherence image distribution as will be described in more details further below.

As described above, the pattern of the encoder 120 is configured to direct light passing therethrough toward the array of sensor cells 140. Accordingly, the optical modulation provided by the encoding of each unit cell, and the periodicity thereof is configured to direct light transmitted through the different unit cells within predetermined sub-channels toward the detector array 140. Such sub-channels may be associated with diffraction orders, refractive effects that cause broadening, deflection or splitting of light components or other types of response functions as described in more details further below. Also, periodicity of the encoder 120 pattern typically caused certain discretization of the sub-channels due to light interference. This provides light components passing through a unit cell of the encoder 120 to be directed onto sensor cells associated with the corresponding sub-array, while some light components are directed to sensor cells associated with sub-arrays of one or more neighboring unit cells within a certain "proximity region" defining a radius of sub-arrays of the detector array 140 surrounding a selected sub array that is associated with a specific unit cell. Accordingly, each sub-array of sensor cells is configured for collecting light arriving from the encoder 120 including light components propagating through the unit cell corresponding with the sub-array and some light components propagating through one or more neighboring unit cells of the encoder 120. Typically, the detector array 140 is located at a predetermined distance L from the encoder such that diffraction orders associated with light passing through the encoder have displacements (along the transverse directions) associated with size of sub-arrays of the sensor cells, to simplify processing of the collecting intensity distribution. Generally, the predetermined distance is selected in relation to the Talbot distance and arrangement of said periodic pattern of the encoder. It should however be noted that the distance L is typically determined in accordance with optical path experienced by light components propagating from the encoder 120 to the detector array 140. Generally, certain optical relay unit may be used to allow longer propagation, as well as magnification, of light components between the encoder 120 and the detector array 140. Such relay unit may be configured as a telescopic unit, or any other relay optical arrangement. Further, typical manufacturing/assembly tolerance to variation in the distance L between the encoder 120 and the detector array 140 is acceptable, however, when determining structure of the intensity basis functions as described further below, the actual distance L should preferably be used.

As described above, the encoder 120 and periodic pattern thereof is configured to direct light into one or more sub-channels, corresponding to diffraction orders or ray propagation as determined by geometrical optics. More specifically, when passing through a single unit cell of the encoder, light components may undergo diffraction and/or refraction effects in accordance with the pattern type used. Further, the diffraction effects associated with light components passing through a single unit cell, providing a fundamental response as will be described further below with reference to FIGS. 2A and 2B, typically interfere with light components passing through neighboring unit cells resulting in somewhat discrete sub-channels (also referred to as diffraction orders). Such effects may result from periodicity of the encoder and is thus generally provided when the encoder utilizes non-diffractive pattern on a single unit cells (e.g. micro-lenses).

Figure 2A:
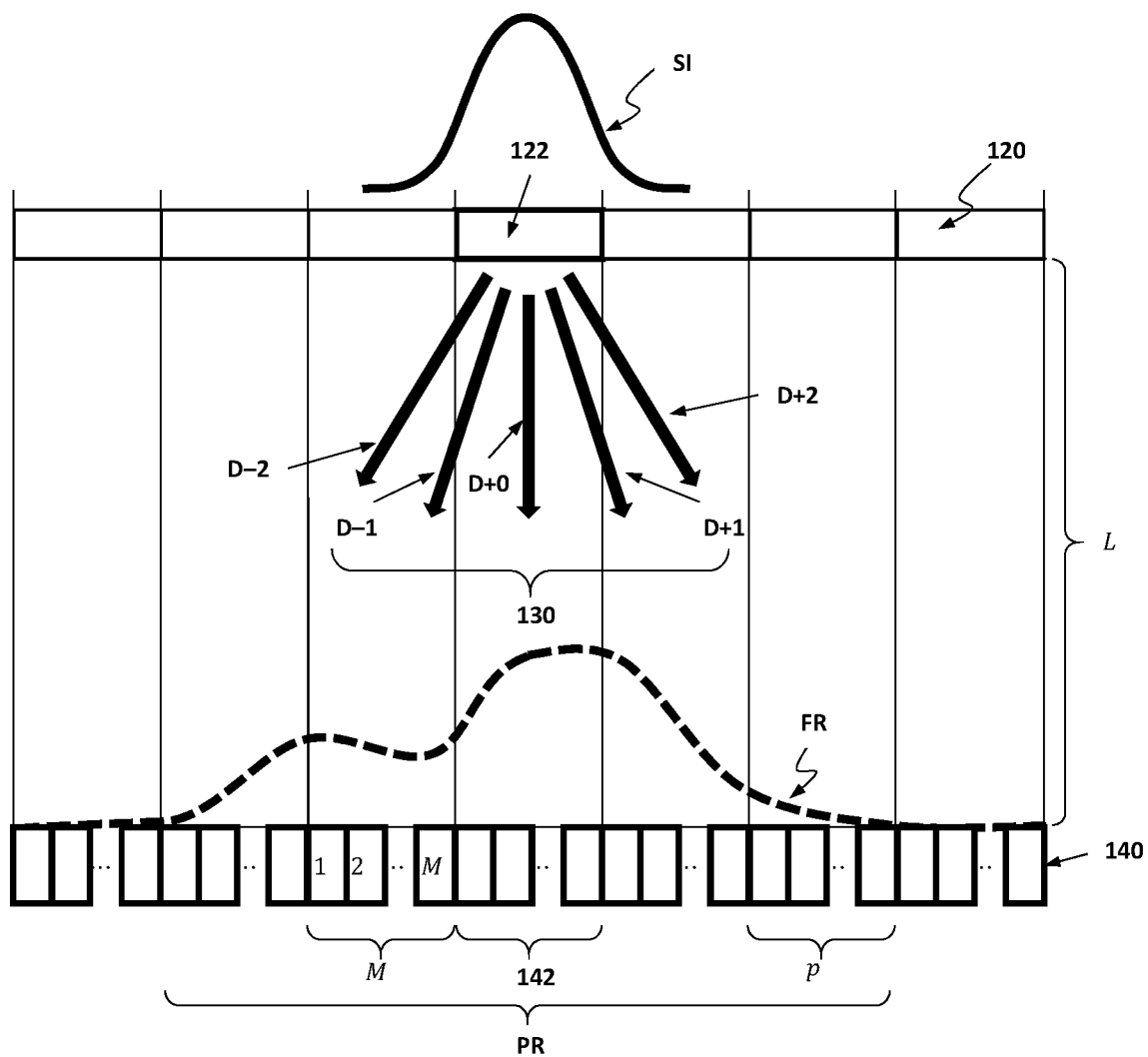
FIGS. 2A and 2B exemplify fundamental response function of an encoded unit cell according to the technique of the present invention.
Figure 2B:
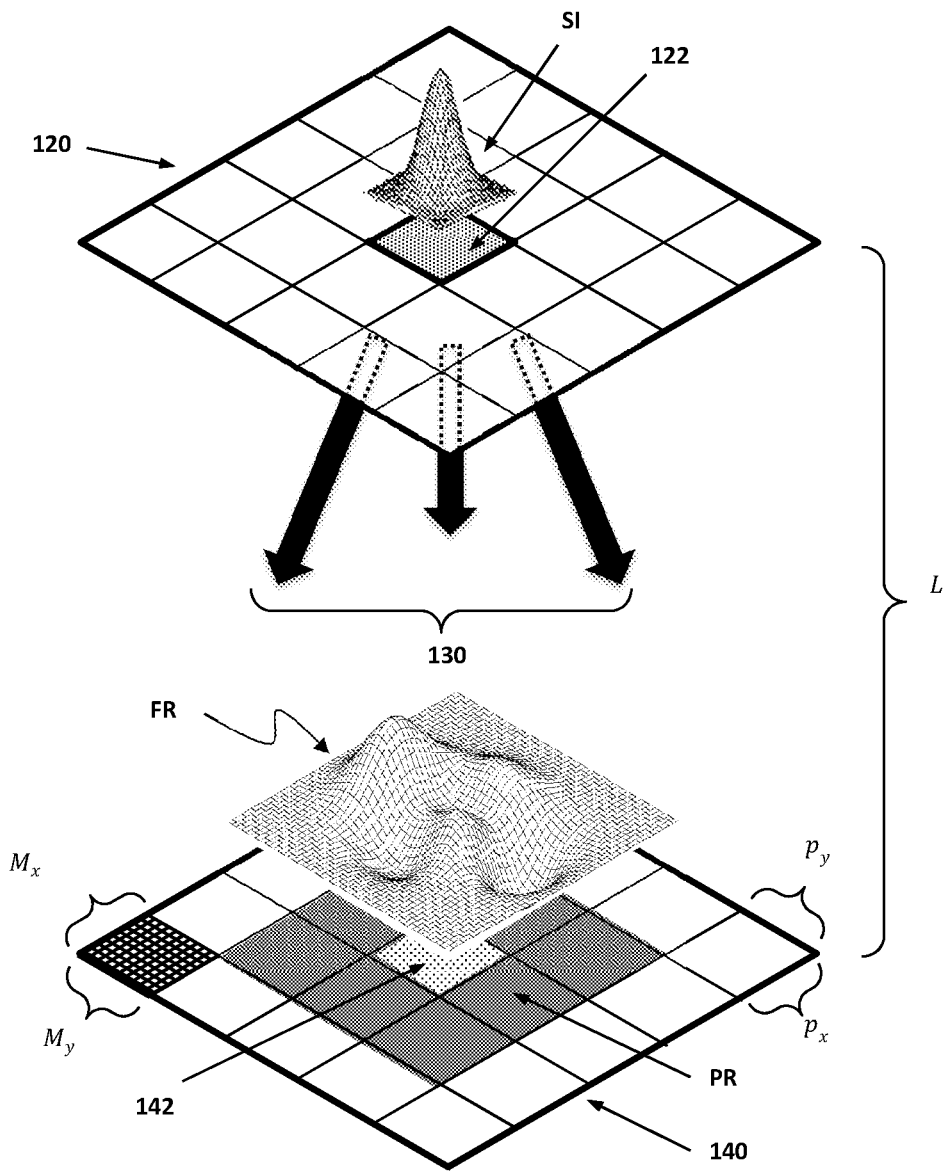

In this connection reference is made to FIGS. 2A and 2B illustrating input light SI transmitted through a single unit cell 122 of the encoder 120 with pitch p and propagating a distance L toward the detector array 140 forming a fundamental response function FR that may be detected (in intensity detection) by the detector array 140. Generally, FIG. 2A illustrates a simplified one-dimensional illustration and FIG. 2B illustrates a more realistic two-dimensional configuration. In this connection, the fundamental response function FR relates to complex data (amplitude and phase) of light field propagating downstream of the encoder and resulting from an impulse light field (e.g. in the form of a diffraction limited spot excitation of imaging system 110, or a Gaussian, rectangular, or delta function-like) impinging on a unit cell of the encoder 120. Generally, light passage through a region of the encoder 120 associated with a single unit cell 122, and the fundamental response thereof may be used for processing the intensity distribution data collected by the detection system 100. As shown, input light field SI directed onto a single unit cell 122 of the encoder undergoes predetermined light modulation and propagates through sub-channels 130 toward the detector array 140. Generally, the modulation provided by a single unit cell 122 is continuous, providing a substantially continuous fundamental response function FR. However, arrows marking five sub-channels (D−2 to D+2) are illustrated for completeness. As described above, these sub-channels can be treated as discrete diffraction orders which typically result from periodicity of the encoder 120. As previously stated, a certain encoder unit-cell 122 transmits light through sub-channels 130 to a number of detector sub-arrays within the proximity region PR. This relation is equivalent to the dual statement that a single sub-array 142 associated with a single unit cell 122 receives light impinging on it through appropriate sub-channels 130 from neighboring encoder unit-cells, also defined in an analogous proximity region.

As indicated above, the number of sensor cells M in sub-arrays 142 or the detector array 140 associated with the different unit cells of the encoder 120 may be selected in accordance with patterning of the encoder and the number of sub-channels transmitting light components from the unit cell 122 to the sub-arrays 142 within a certain proximity region PR. Additionally the number M of sensor cells may be selected in accordance with selected basis reconstructions as described further below, enabling effective reconstruction of phase or coherence mapping of collected light with reduced number of sensor cells. In general, the fundamental response function FR falls off to negligible values outside the proximity region PR. For example, the pattern of the encoder may be configured to provide interaction of collected light with light components associated with one, two or more neighboring unit cells, e.g. defining nearest neighbors' interaction, next nearest neighbors etc. Further, the level of neighbors' interaction may be different for the different transvers axes (x, and y) of the detector system 100. Generally, the number M of sensor cell associated with each unit cell 122 is selected to be no less than $M \geq 2n_R+1$, where $n_R$ is the total number of neighboring unit cells in the proximity region PR, i.e. the number of all of the neighboring unit cell interactions with respect to a given unit cell, but with each interaction counted only once. However, as indicated above and described in more details further below, in some configurations the number M of sensor cells may be reduced in accordance with number of basis functions used for reconstruction of the collected field. For example, if the optical encoder is configured to create interactions between a unit cell and its nearest neighbor to its right and its nearest neighbor above it, then $n_R=2$. This specific unit-cell will also have interactions with the unit cells to its left and below it. However, these interactions are counted as belonging to the respective neighboring unit cells to the left and below, so as to not count the interactions twice. In the case where the proximity region is separable to interactions along the x and y axes, then $M \geq (2n_R^x+1)(2n_R^y+1)$, where $n_R^x$ is the number of neighboring unit cell interactions along the x axis, and $n_R^y$ is the number of neighboring unit cell interactions along the y axis. As before, the number of interactions $n_R^x$ and $n_R^y$ are counted in a single-sided fashion, so that no interaction is counted twice.

Referring back to FIG. 1, the detection system 100 is typically configured to include, or be associated with a control system 500 configured for receiving data about intensity distribution of collected radiation from the detector array 140, and for processing the received data in accordance with data about patterning and arrangement of the encoder 120 to determine data about intensity, phase and coherence distribution of collected light. The control system typically includes a processing utility 550 and a storage utility 600, as well as communication utility enabling input and output communication and possible user interface, which are not specifically shown.

The control system 500 may be integral with the detection system 100 or separated therefrom. In some embodiments, the control system 500 may be remote from the detection system 100 or be based on remote or cloud processing of data. In such configurations, the detection system 100 may include a communication module configured for transmitting data about the pattern of the encoder 120 and intensity distribution data collected by the detector array 140 to the control system 500 for processing.

Figure 3:
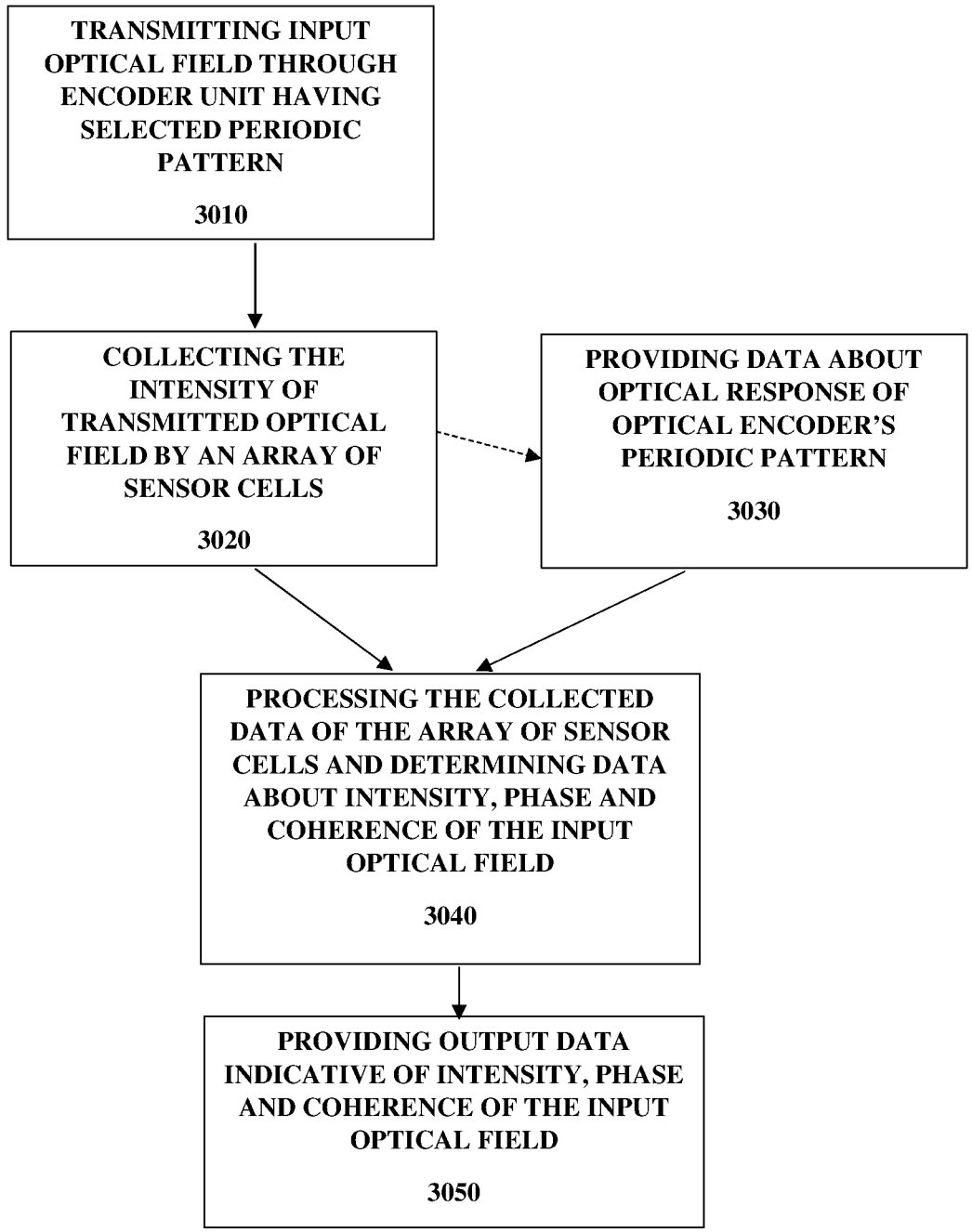
FIG. 3 illustrates a process of determining mutual coherence of input optical field according to some embodiments of the invention.

Reference is made to FIG. 3 exemplifying a flow chart diagram of the technique for detection of phase and coherence data according to the present invention. As shown, the present technique includes transmitting input optical field, or any other electromagnetic radiation such as infra-red, visible light, x-ray radiation, gamma radiation etc., through an encoder applying a predetermined periodic pattern to the collected radiation 3010 and collecting patterned light intensity distribution by a detector array located at a predetermined distance L downstream of the encoder 3020. For processing of the collected data, the technique utilizes data about response of at least one unit cell of the periodic pattern 3030. Such data about response of unit cells of the periodic pattern may be based on a simulated or calculated fundamental response function, determined in accordance with conventional wave propagation theories and simulations, indicating amplitude and phase distribution of light components passing through a single unit cell or a set of "coherence basis functions" and their corresponding "intensity basis function" associated with intensity maps as described in more details further below. Generally, such response data (3030) may be pre-stored for use in processing. Alternatively or additionally, collection of transmitted light in response to certain predetermined light input distributions corresponding to coherence basis functions (e.g. as exemplified in FIG. 7) may be used for determining a set of intensity basis functions. The technique utilizes the data about response of light transmission through the optical encoder's periodic pattern 3030, for processing 3040 of the collected data to determine phase and coherence data of the collected light. The output data 3050 provides data about coherence matrix indicative of the input optical field, including off-diagonal elements associated with neighboring unit cell interactions within the defined proximity region.

Figure 4:
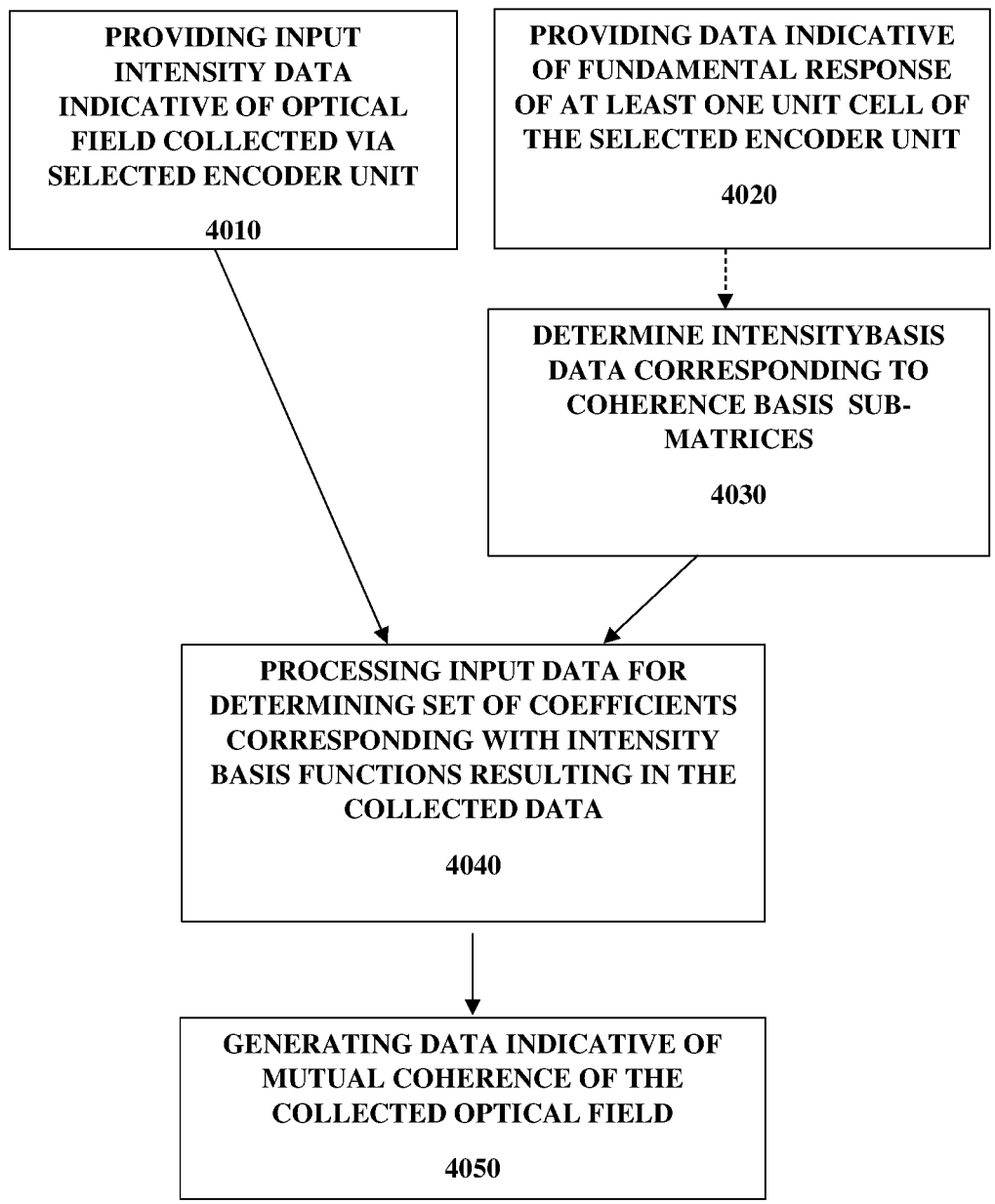
FIG. 4 illustrates data processing technique for determining mutual coherence of input optical field according to some embodiments of the invention.

The processing technique of the intensity distribution data collected by the detector array is illustrated in more details in FIG. 4. As shown the processing generally includes receiving data about the intensity distribution collected by the detector array 4010, providing data about the fundamental response function of the optical encoder's periodic pattern/modulation 4020, and processing the input data. The data about response of the periodic pattern may include data about the fundamental response function of a signal unit cell. The processing may include pre-processing of the fundamental response function for determining a set of coherence basis functions 4030, which are associated with coherence matrix structures and provide a set of basis vectors spanning a general mutual coherence matrix of input optical field as collected by the device 100. These coherence basis functions are associated with a set of intensity basis functions, where each one corresponds to the intensity pattern created by each said coherence basis function propagating through the encoder 120 and impinging on the detector array 140. In other embodiments, the coherence basis functions and their associated intensity basis functions may be pre-calculated and/or measured and their data may be used directly as pre-provided data in lieu of 4020. The coherence basis functions are described in more details further below with respect to FIGS. 6A-6E and FIGS. 7A-7E exemplifying matrix representation of the coherence basis functions in the form of a mutual coherence matrix.

Processing of the input collected intensity distribution data 4040 may be associated with determining a set of coefficients describing the input intensity data from detector array 140 in the form of a weighted sum of the intensity basis functions. Accordingly, the set of coefficients and the coherence basis functions are used for generating 4050 output data associated with mutual coherence of the input optical field.

Figure 5:
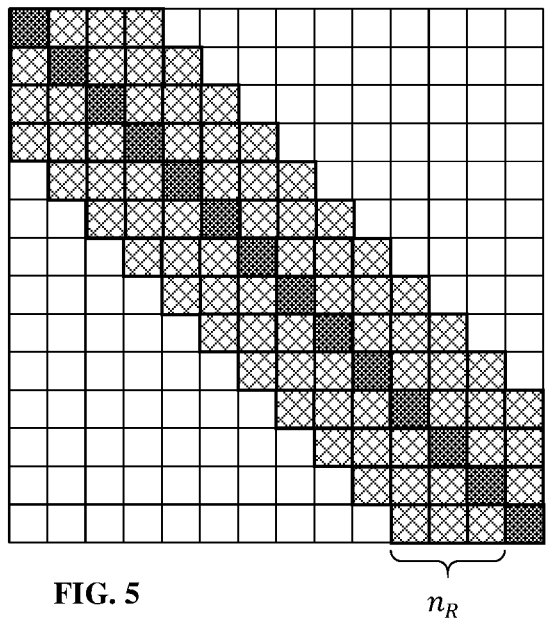
FIG. 5 exemplifies mutual coherence matrix.

In this connection, the mutual coherence p of an optical field defines time averaged spatial correlation of the field, being:

$$\rho(x,x')=\langle E(x)E^*(x')\rangle \quad \text{(equation 1)}$$

where x=(x, y) relates to the transverse spatial coordinates of the field. Generally, the use of a detector array and digitized data requires certain discretization of the mutual coherence providing a mutual coherence matrix in the form of:

$$\rho_{ij}=\langle E(x_i)E^*(x_j)\rangle \quad \text{(equation 2)}$$

Where $E(x_i)$ relates to complex amplitude of the field at point $x_i=(x_{i_x}, y_{i_y})$, and $E^*(x_j)$ relates to the complex conjugate of the field at point $x_j=(x_{j_x}, y_{j_y})$. It should be noted that physically possible realizations of a mutual coherence matrix are Hermitian and non-negative. Conventional detection techniques, or a typical detection device or system, provide data indicative of the diagonal elements which correspond to conventional intensity measurements, i.e. $I_i=\rho_{ii}=\langle E(x_i)E^*(x_i)\rangle$, while being generally incapable of determining the off-diagonal elements, which correspond, partially, to phase and coherence relations between optical field. In this connection, reference is made to FIG. 5 illustrating a mutual coherence matrix determined according to some embodiments of the present invention. Matrix elements whose values are determined according to the present technique are marked with pattern. Generally, in addition to the diagonal elements, the present technique enables determining a certain number of off-diagonal elements of the matrix corresponding to the possible interactions between each unit cell and its corresponding neighbors within each proximity region. Generally, the periodicity of the optical encoder provides that the off-diagonal matrix elements form a matrix representation with band diagonal structure. For simplicity, the exemplary coherence matrix structure illustrated in FIG. 5 has a band diagonal structure corresponds to an optical encoder with one transverse dimension. Each row in the matrix corresponds to one unit-cell. In this example, we see that each unit cell interacts with 3 neighbors to its right and 3 neighbors to its left. Hence the matrix band structure has 3 sub-diagonals and 3 super-diagonals. In this case $n_R=3$, corresponding to the number of neighboring unit cells interactions belonging to the proximity region of the encoder 120 being collected by sub-arrays 142 of the sensor elements. As before, each interaction is generally counted once, i.e. only the single-sided number of elements per row (either sub-diagonal or super-diagonal elements, but not both). Further, in two-dimensional imaging, the mutual coherence matrix may often be represented as including a plurality of matrix blocks with band-diagonal structure. Accordingly, the different rows of the mutual coherence matrix, corresponding with encoder unit cells, have $2n_R$ possibly complex-valued off-diagonal elements associated/interacting therewith. However, due to the Hermiticity of the mutual coherence matrix, these off-diagonal elements have only $2n_R$ real-valued degrees of freedom. Thus, together with the diagonal element, each row has $2n_R+1$ real degrees of freedom associated with it, i.e. each unit-cell is associated with $2n_R+1$ real degrees of the input optical field. These $2n_R+1$ degrees of freedom per unit cell correspond to the generally required minimal number of detector units per detector unit cell sub-array 142 in the form $M \geq 2n_R+1$.

Generally, the control system 500 may utilize pre-stored data indicative of the fundamental response function FR (including complex amplitude and phase data) for analyzing data collected by the detector array 140 for determining mutual coherence matrix of the input optical field. Alternatively, or additionally, as described above, the control unit may utilize pre-processing of the fundamental response function for determining a set of coherence basis functions (4030 in FIG. 4) associated with function structures providing basis vectors spanning coherence matrix of a general input optical field. This predetermined set of input fields represents a basis structure of the mutual coherence matrix of FIG. 5. Accordingly, the coherence basis functions are associated with intensity basis functions which represent intensity data at the detector array 140 associated with input field through a single, or predetermined set of unit cells of the encoder 120 corresponding to said coherence basis functions. Each of these input field basis functions is in one-to-one correspondence with an intensity basis function representing a specific intensity map at the detector array 140.

Figure 6:
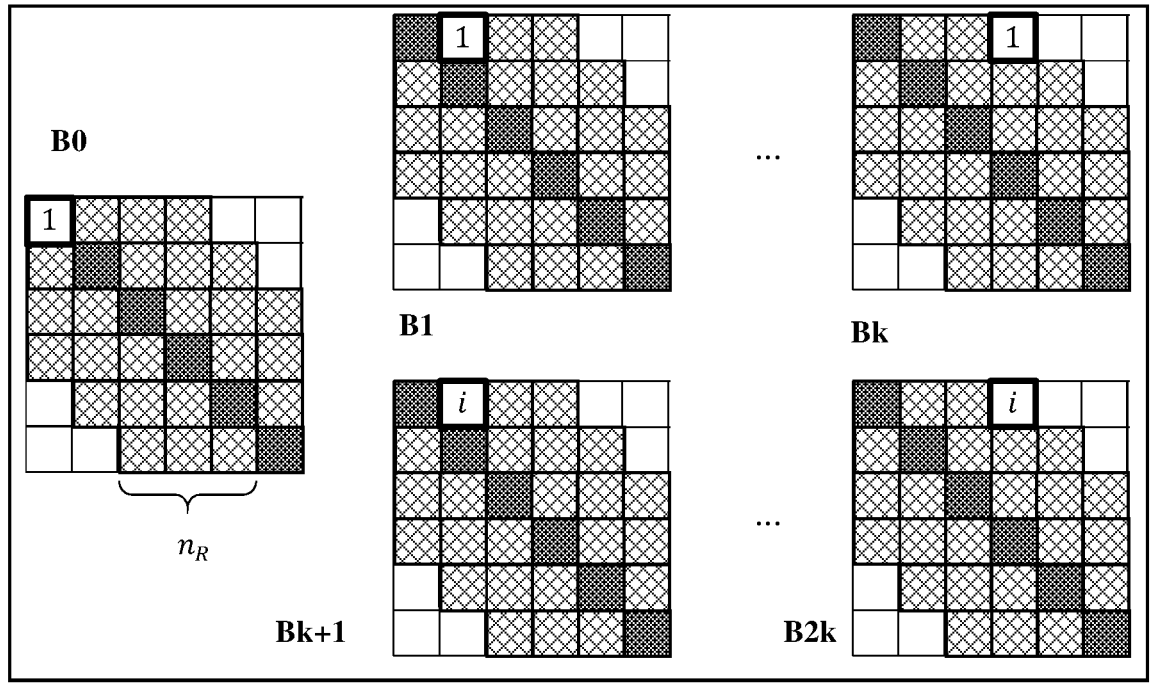
FIG. 6 illustrates a set of coherence basis vectors suitable for use in processing of input optical field according to some embodiments of the invention.
Figure 7:
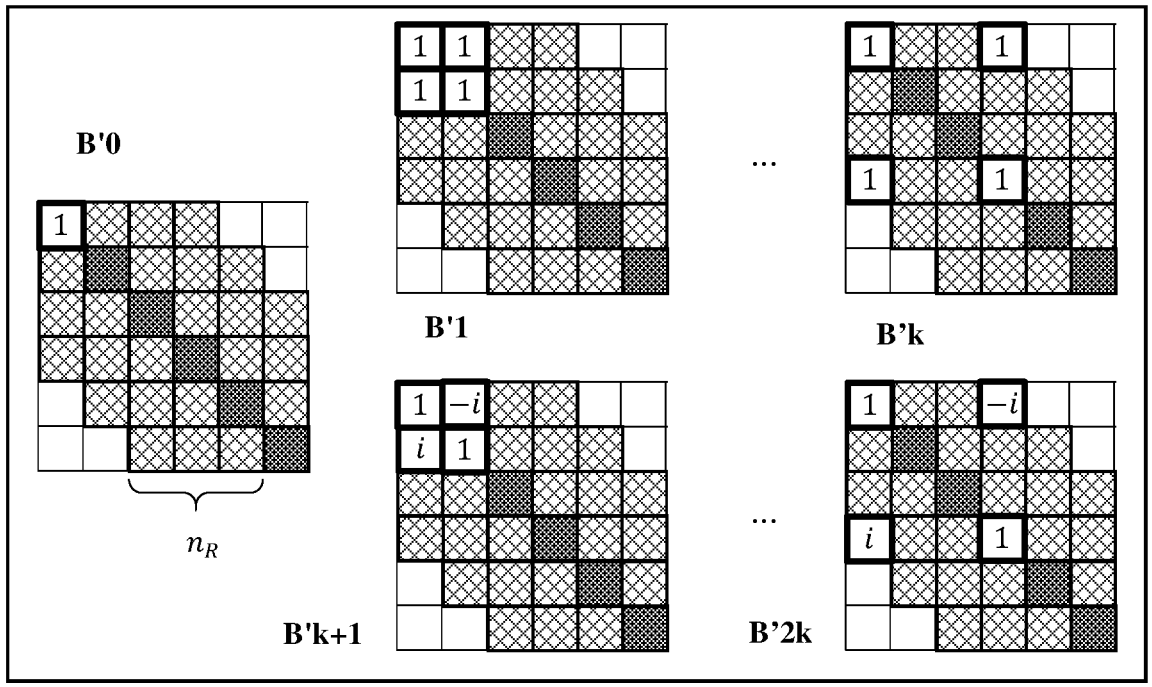
FIG. 7 illustrates another set of coherence basis vectors suitable for use in processing of input optical field according to some embodiments of the invention.

FIGS. 6 and 7 illustrate two possible sets of coherence basis functions suitable for use in processing a general collected input field according to the present technique. FIG. 6 illustrates a set of coherence basis functions (vectors) B0, B1-Bk and Bk+1-Bk2, where $k=n_R$, relating to the number of single-sided off-diagonal elements per matrix row. FIG. 7 illustrates an alternative set of coherence basis r functions B'0, B'1-B'k and B'k+1-B'2$k$, being a different choice of coherence basis functions, while generally providing similar processing and results. These coherence basis functions can be used to represent the mutual coherence matrix representing the input optical field to device 100.

Typically, due to periodicity of the encoder unit, the unit cells thereof and the corresponding coherence basis functions and their associated intensity basis functions are generally translation-invariant. Accordingly, a set of coherence basis functions $\{B_{ij}^k\}_k$ may be selected based on a single unit cell, as exemplified in FIGS. 6 and 7, and shifted/translated for other unit cells without additional changes. Accordingly, the associated set of intensity basis functions $\{\mu_n^k\}_k$ may also be defined on a single unit cell and then is shifted/translated to extend the basis to other unit cells. Typically, the number of coherence basis functions may be no less than $2n_R+1$ basis elements per unit-cell to provide complete basis for representation of all possible coherence matrices associated with the predefined proximity region. The set of coherence basis functions illustrated in FIG. 6 includes matrix elements in the upper-triangle per row. The matrix elements in the lower-triangle are implied through the requirement of Hermiticity of the mutual coherence matrix ρ. In order to enable detection of phase data, the coherence basis functions include elements associated with real and imaginary off-diagonal elements, corresponding to similar phase of field at the unit cell or phase shift of π/2. In this particular basis choice, exemplified on FIG. 6, the coherence basis elements taken individually do not necessarily correspond to physically realizable optical field configurations, and their corresponding intensity basis functions are not necessarily real-valued and positive.

Alternatively, the set of coherence basis functions illustrated in FIG. 7 may be associated to physically realizable input fields, and the matching intensity basis functions are real-valued and positive corresponding to realizable intensity measurements. The coherence basis elements B'0, B'1–B'k and B'k+1–B'2k describe coherent optical fields at the individual unit cells, describing optical input through a selected unit cell and one additional neighbor (to a certain degree) with spatial correlations of 0 and π/2 phase differences between the pixel-pairs. It should however, be noted that physical realizability is not a necessary condition for a choice of basis, and the only necessary condition is that the coherence basis actually spans the space defining all possible mutual coherence matrices associated with the predefined proximity region. The only requirement is that there are enough coherence basis elements whose linear superposition with real coefficients provide a full description of the coherence matrix up to at least the prescribed number of sub(super)-diagonals $n_R$ corresponding to the number of single-sided interactions the optical encoder 120 imposes between neighboring unit-cells within the specified proximity region PR. Accordingly, the number of neighbor interactions $n_R$ corresponds to an "off-diagonal radius" of the coherence matrix. Generally, other coherence basis choices are possible, including for example, coherence matrices corresponding to optical point-spread functions with varying degrees and types of aberrations, various polynomial or Fourier-basis decompositions etc. Selection of the coherence basis set may be associated with certain optimization with respect to data about input light field to be analyzed, the actual pattern of the encoder, and the associated intensity basis functions.

The coherence basis functions illustrated in FIGS. 6 and 7 describe vector elements spanning possible coherence matrices associated with the predefined proximity region. Generally, the present technique utilizes data about sensed optical field associated with the coherence basis functions $\{B_{ij}^k\}_k$. More specifically for each coherence basis function $\{B_{ij}^k\}_k$, the pre-stored data may generally include the intensity basis functions $\{\mu_n^k\}_k$, typically in the form of a set of intensity maps. In the case of the set of coherence basis functions illustrated in FIG. 7 this may be explained as the intensity maps measured by the detector array 140 in response to input light as described by the coherence basis functions, i.e. input light transmitted through a single unit cell, and through the single unit cell and one additional neighbor with corresponding phase relation as described by the coherence basis functions.

The intensity maps typically provide that for an arbitrary coherence matrix $\rho_{ij}=\Sigma_k a_k B_{ij}^k$ of input optical field, the measured data generates an intensity pattern given by $$I_n=\Sigma_k a_k \mu_n^k \quad \text{(equation 3)}$$

Accordingly, the technique of the present invention utilizes determining an inverse relationship (inverse matrix) enabling to determine the coefficients $a_k$ for a given measured intensity map $I_n$ and thus to reconstruct an estimate for the coherence matrix being $\rho_{ij}=\Sigma_k a_k B_{ij}^k$.

It should be noted that, for the purposes of some applications, sufficient phase information may be determined to reconstruct an estimated coherence matrix using only a subset of the coherence basis functions, as possibly using a single (non-trivial) basis function. However, this may simplify processing, as well as enable a level of phase detection with reduced number of sensor cells corresponding with each unit cell.

Generally, the use of a sub-set of coherence basis is associated with a corresponding number of intensity basis functions. As the intensity basis functions are distinguished by intensity profile and thus associated with a corresponding number of sub-pixels M (e.g. for mapping the intensity functions and enabling reconstruction thereof). If a sub set of two coherence basis functions is used, then only two intensity basis functions are needed to be identified within collected optical field. The difference between the intensity functions can thus be identified with reduced number of sensor cells associated with each unit cell. In this example, only two sub-pixels may be needed (below the general $M=2n_R+1$ sensor cells associated with reconstruction for a full basis set).

It should be noted that such sub set may be any selected sub set, and may or may not include the pure intensity coherence basis function B'0. More specifically, a suitable sub set may preferably include at least one complex coherence basis function, e.g. B'$2k$ in FIG. 7. In some configurations, a single complex basis function may be sufficient for reconstruction of phase information, while enabling detection with limited number of sensor cells associated with the unit cells as described herein.

Coherence reconstruction using limited sub set of coherence basis functions is generally similar to the using full set of coherence basis functions. This is associated with sub-channels of each unit cells arriving at sensor cells of neighboring unit cells and enabling cross talk between pixels of the reconstructed coherence map/image.

Referring back to FIG. 4, processing of the input data 4040, corresponding to measured intensity map $I_n$ received from the detector array 140, is generally based on determining a set of coefficients $a_k$ satisfying equation 3 above with respect to a selected set of intensity basis functions $\{\mu_n^k\}$. Further, generating data indicative of mutual coherence of the optical field 4050 may be done using the so-determined set of coefficients to reconstruct an estimate for the coherence matrix by using the coherence basis functions $\rho_{ij}=\Sigma_k a_k B_{ij}^k$.

Figure 8A:
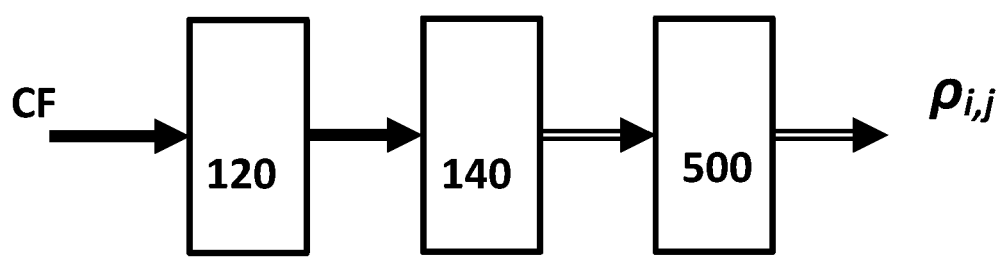
FIGS. 8A to 8C exemplify elements for single configuration (FIG. 8A), parallel multi-configuration (FIG. 8B), and sequential multi-configuration (FIG. 8C) optical encoding and processing input field according to some embodiments of the invention.
Figure 8B:
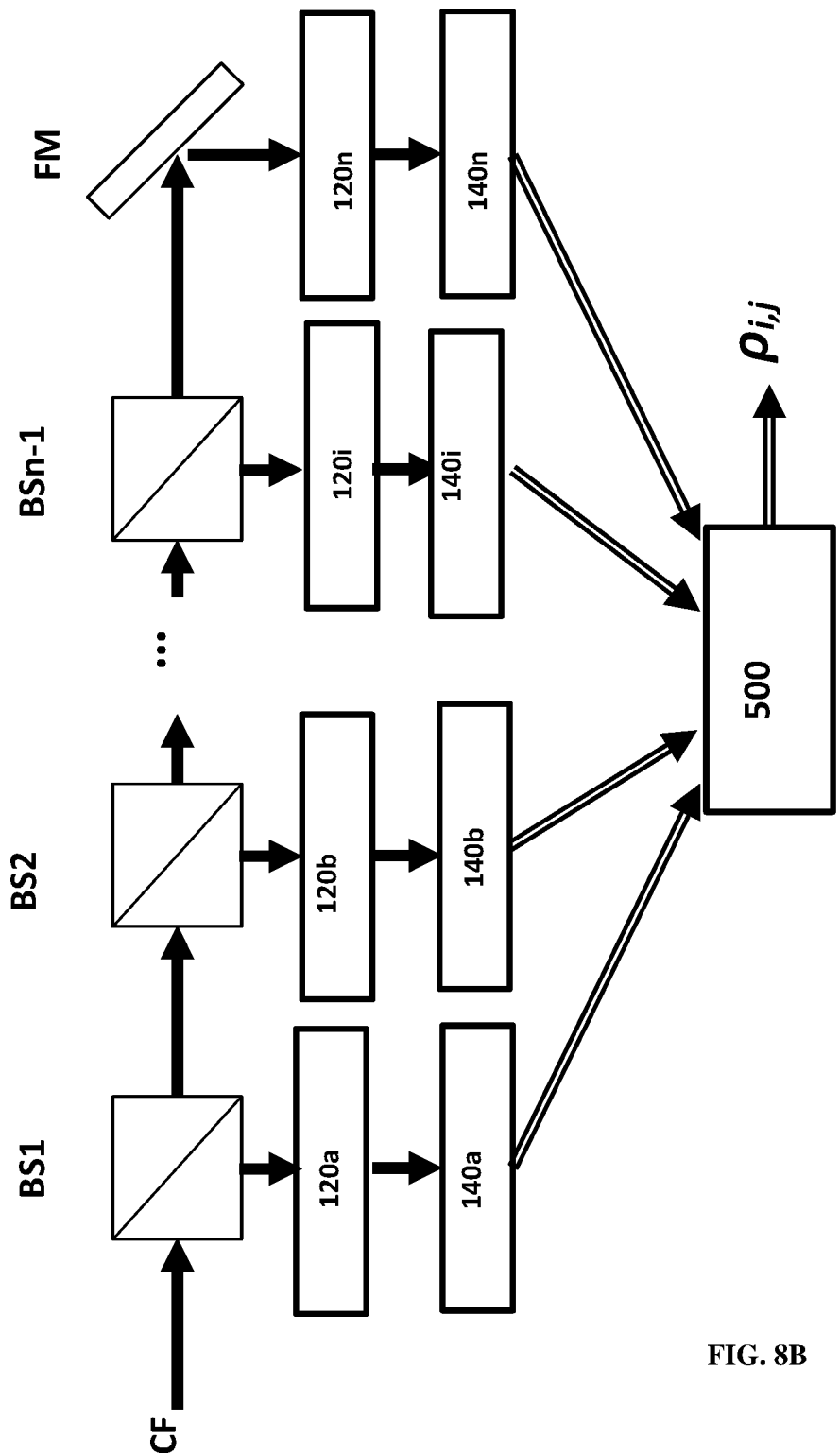
Figure 8C:
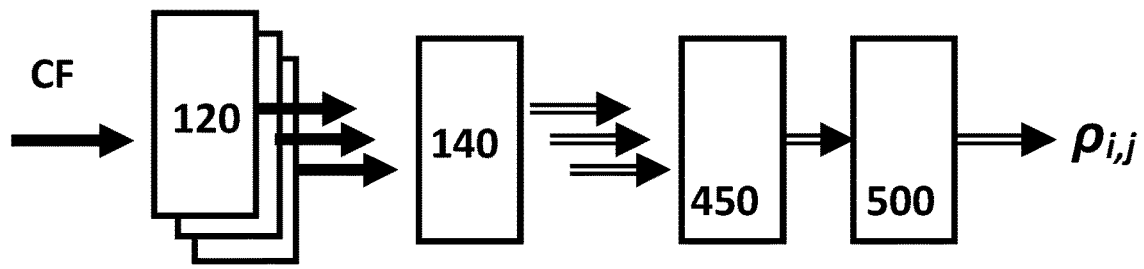

Accordingly, FIGS. 8A to 8C illustrate some concepts of the present techniques in a way of a block diagram. FIG. 8A illustrates single encoding technique as described above, FIG. 8B illustrates parallel encoding technique, and FIG. 8C illustrates a temporally varying coding technique, all utilizing the above described technique for determining intensity, phase and coherence data of input collected light field CF. Generally, the different techniques may be used by corresponding detection system as illustrated in FIGS. 8A to 8C, e.g. utilizing light splitting elements or a varying encoder.

As shown in FIG. 8A, collected optical field CF is transmitted through an encoder 120 providing certain predetermined patterning to the light. As described above, the patterning is based on a plurality of unit cells, each applying a predetermined fundamental response function to light passing therethrough. The so-patterned light is then collected by a detector array 140 and the detected intensity map is transmitted for processing by a control system 500. The processing utilizes data in the form of a set of intensity basis functions as described above to determine a set of coefficients such that the weighted sum of the intensity basis functions with the so-determined coefficients results in the collected intensity map $I_n$.

FIG. 8B illustrates a parallel, multi-configuration technique of optical field detection system. The parallel configuration utilizing splitting of the input optical field CF, such splitting may be provided as exemplified by a plurality of beam splitters BS1-BSn−1 and in this example includes a folding mirror FM directing the n'th light component to the corresponding encoder 120n. The different replicas of the input field CF are transmitted through corresponding plurality of encoders 120a-120n and further toward corresponding detector arrays 140a-140n. So-collected data pieces about a plurality of intensity maps are transmitted to a control system 500 for processing and determining data about mutual coherence matrix of the collected light field CF.

Utilizing such parallel configuration exemplified in FIG. 8B, the different encoders 120a-120n are generally configured with different patterns. More specifically, all the encoders 120a-120n are configured with periodic patterns associated with a plurality of unit cells, each carrying a selected pattern thereon. Generally, however, the periodicity of the different encoders may be shifted such that the periods are integer multiples of the theoretical unit cell (whose size is determined to provide desired geometrical lateral resolution), so that the different encoders 120a-120n are shifted by an integer number of unit-cells (which may be a fraction of the encoder period) as exemplified in FIGS. 22A-22D further below. Alternatively or additionally, the pattern associated with each unit cell may be different, corresponding to different fundamental response function FR. Alternatively or additionally, the propagation distance L of each such encoder may be different, again corresponding to a different fundamental response function FR.

In accordance with the different patterning applied to collected light by the encoders 120a-120n, the control unit may utilize pre-stored data about corresponding basis response functions as described above. The digital intensity maps detected by the detector arrays 140a-140n are processed separately or combined, with respect to the basis response functions corresponding with the relevant coding for determining an estimated coherence matrix of the collected optical field CF. It should generally be noted that this configuration may utilize a single detector array having a plurality of regions, each dedicated for collection of light component transmitted through one of the encoders 120a-120n, thus maintaining separation of the differently patterned light components.

An additional configuration is illustrated in FIG. 8C and is based on a sequential multi-configuration architecture. In these embodiments, the encoder 120 may be configured to vary its pattern, e.g. by replacing a patterned mask mechanically or electronically, or by changing the propagation distance L, and the detector array is operable for collecting data pieces providing collected intensity maps associated with each of the patterns. For each configuration of the encoder 120, a digital intensity image is recorded by the detector array 140. The image data pieces from all configurations may be stored in a buffer or storage utility 450 and may be processed as described above for determining coherence matrix estimate $\rho_{ij}$.

Figure 9:
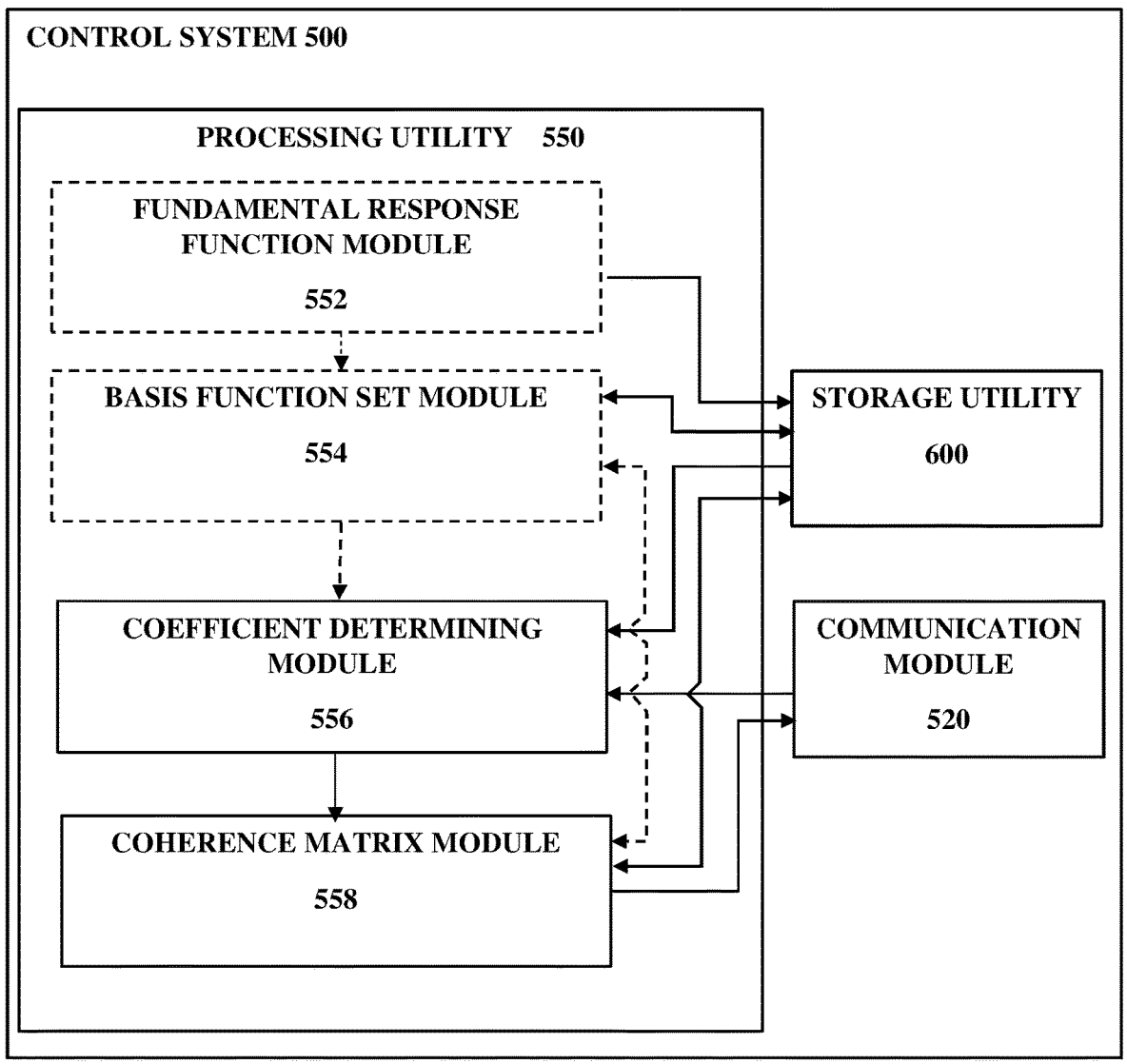
FIG. 9 illustrates in a way of a block diagram a control system suitable for processing intensity map according to some embodiments of the invention.

In this connection reference is made to FIG. 9 schematically illustrating a control system 500 configured for use according to some embodiments of the present invention. The control system 500 may generally be a computerized system including at least one processing utility 550, communication module 520 providing input, output and user interface communication, and may include or be associated with one or more storage utilities 600. The processing utility 500 may utilize a local processor or be configured for distributed processing using one or more remote processors as the case may be. Generally, the processing utility includes one or more processing modules, which may be software and/or hardware modules, describing relevant processing actions according to the present techniques.

In some embodiments, the processing utility 550 may include a fundamental response function module 552 configured for receiving data about pattern of the encoder(s) and determining, e.g. by simulation of field propagation through a unit cell of the encoder, data indicative of fundamental response function of the encoder. The basis function set module 554 is configured for utilizing data about fundamental response functions, received from the storage utility as pre-stored data, or from the fundamental response function module 552, and determining a set of at least $2n_R+1$ coherence basis functions and their corresponding intensity basis functions. It should be noted that data about the fundamental response function and/or the set of coherence basis functions and their corresponding intensity basis functions may be pre-provided and pre-stored in the storage utility 600.

Generally, for processing intensity map of collected input field, the processing utility 550 includes a coefficient determining module 556 and a coherence matrix module 558. the coefficient determining module 556 is configured and operable for receiving one or more intensity maps detected by the detector array (140 in FIG. 1) and data about a set of intensity basis functions received from the storage utility 600 (or the basis function set module 554), and for processing the intensity map and the set of intensity basis functions to determine a set of coefficients enabling weighted linear sum of the intensity basis functions resulting in the intensity map, up to certain predetermined error margin that is defined as acceptable. The coherence matrix module 558 is configured for receiving the determined set of coefficients and the corresponding set of coherence basis functions from the basis function set module 554 or the storage utility 600, and determining a resulting estimated coherence matrix p of the collected input optical field. The so determined coherence matrix may typically be transmitted as output to operator or for further processing and/or may be stored for additional processing.

Various configurations of the detector system 100 according to the present invention are described in the following figures. For simplicity, these configurations are exemplified in one-dimension and generalization to the realistic two-dimensional case is generally straightforward.

Figure 10A:
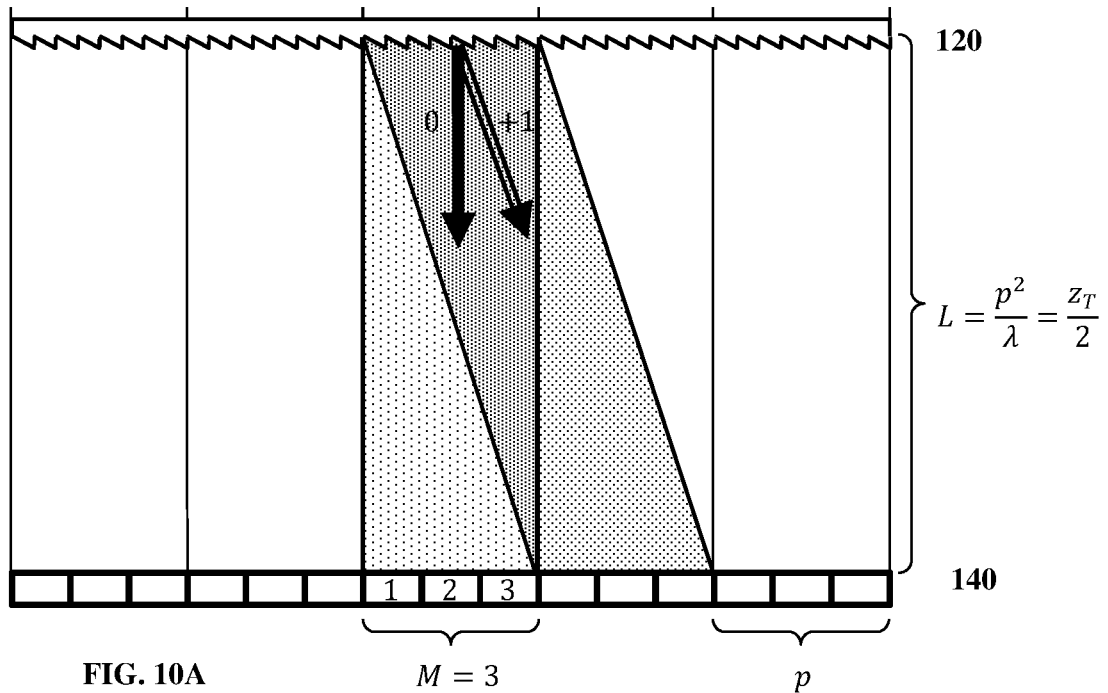
FIGS. 10A and 10B illustrate encoding using grating providing one neighbor unit cell collection scheme.
Figure 10B:
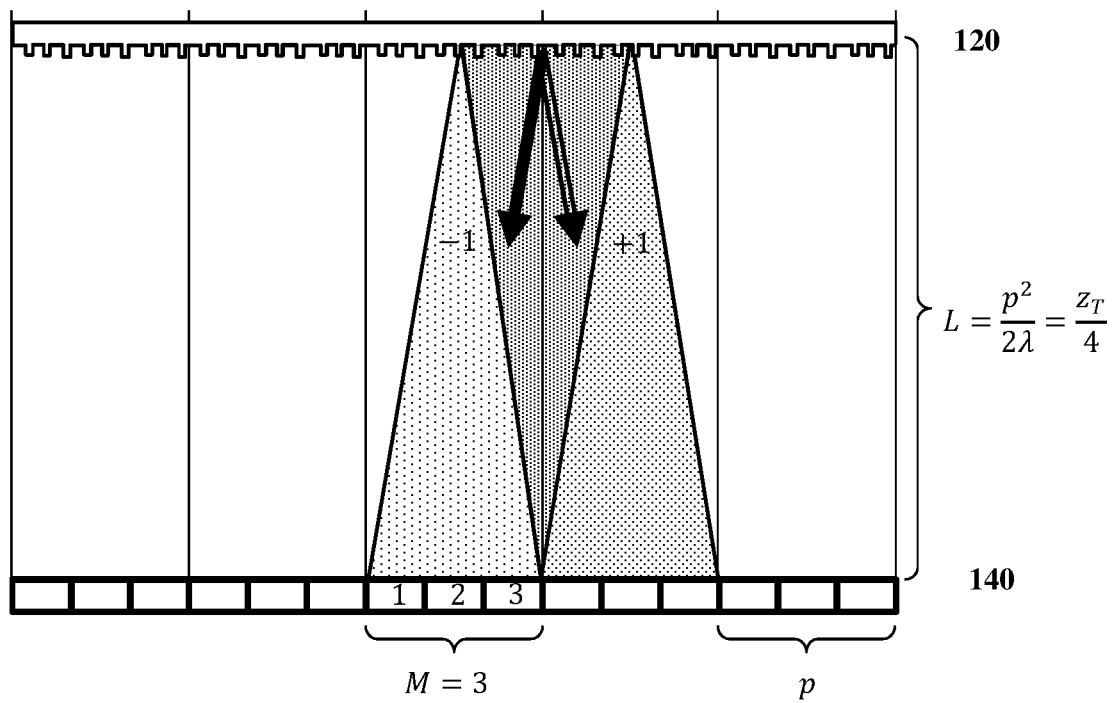

FIGS. 10A and 10B illustrate a grating-type encoder 120 configured for directing light to the detector array 140 with inclusion of one neighbor unit cells for each sub-array of detector elements. FIG. 10A illustrates a unilateral non-symmetric grating design and FIG. 10B illustrates a symmetric grating design. The distance L between the encoder 120 and the detector array 140 is selected in accordance with Talbot distance $z_T = 2p^2/\lambda$, relating to the pitch p of the periodic encoder and typical wavelength $\lambda$ of optical field being collected. In this example, the distance L relates to half Talbot distance providing $$L = \frac{p^2}{\lambda} = \frac{z_T}{2}$$

in the example of FIG. 10A, and a quarter Talbot distance $$L = \frac{p^2}{2\lambda} = \frac{z_T}{4}$$

in the example of FIG. 10B. In the first example in FIG. 10A, the grating is designed to diffract to the zeroth and the +1 diffraction orders (with typically similar diffraction efficiencies), while in the second example in FIG. 10B, the grating is designed to diffract to the +1 and −1 diffraction orders, with negligible diffraction to all other orders (including the un-diffracted order 0). (Such gratings are commercially available, or they can be designed and manufactured by those practiced in the art of diffraction gratings.) Additionally, the number M of detector elements in each sub-array is determined in accordance with the number of neighbor unit cells projecting light to each sub-array. As described above, the number M of detector elements in sub-array is no less than $M \geq (2n_R^x+1)(2n_R^y+1)$. In the one-dimensional example with $n_R=1$, M may be equal to three (M=3) or more. It should be noted that generally, for each unit-cell (of pitch p) in the encoder 120, there are preferably no less than M corresponding detector elements per transverse direction in the detector array 140, typically, each with size of up to p/M.

Figure 11A:
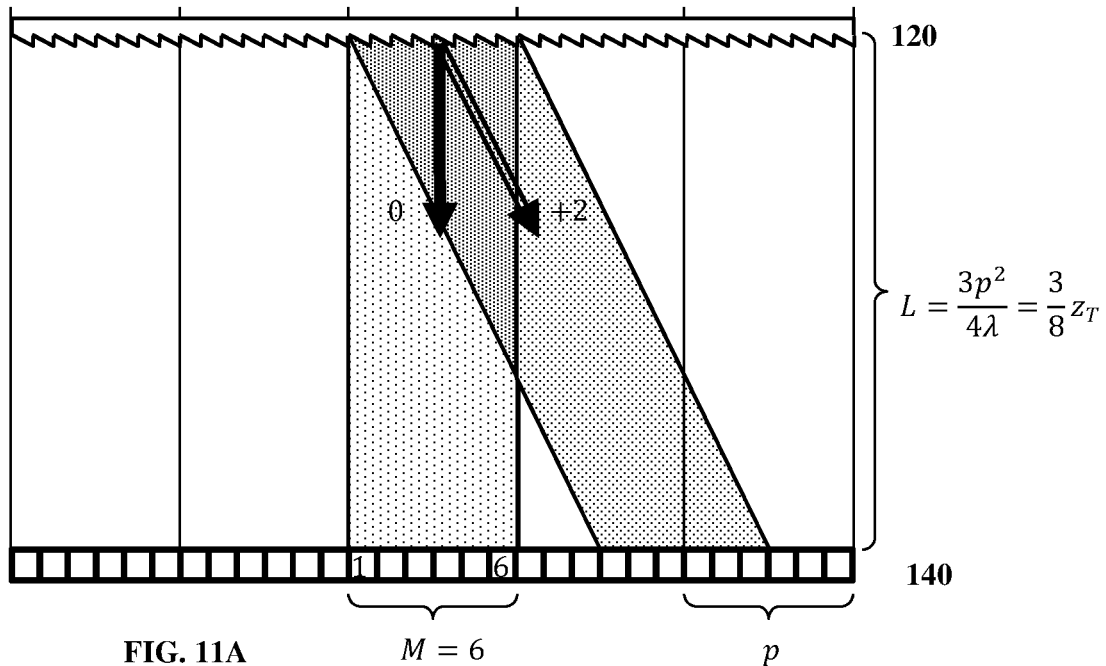
FIGS. 11A and 11B illustrate encoding using grating providing two neighbor unit cells collection scheme.
Figure 11B:
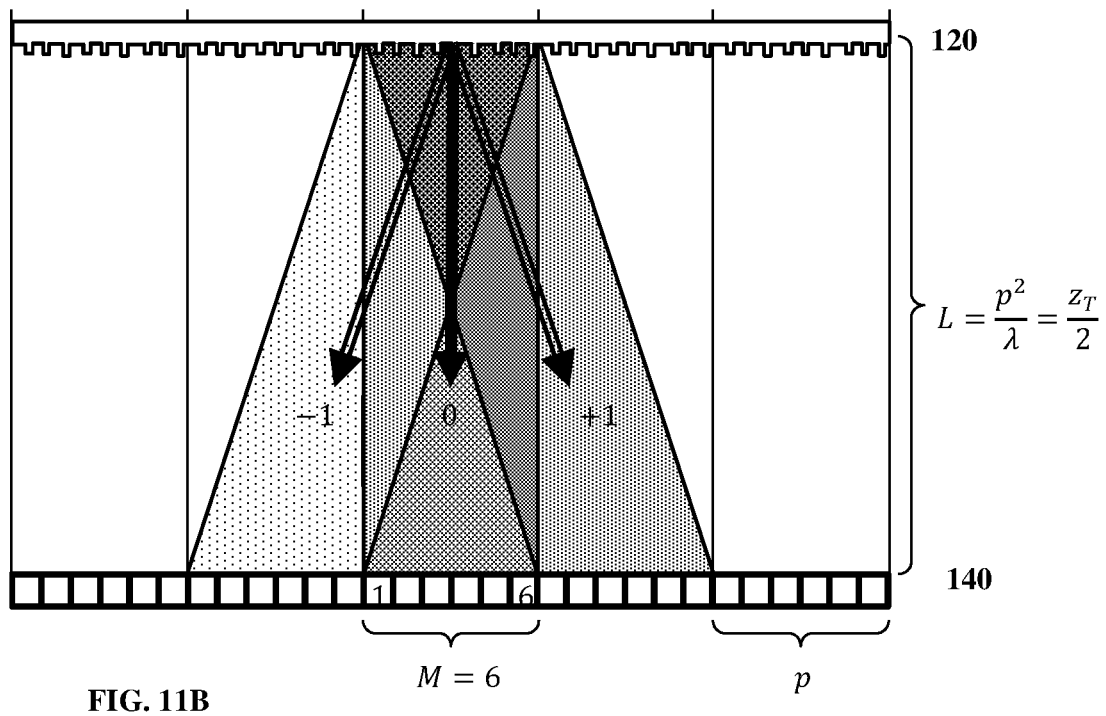

Additional grating type configurations are exemplified in FIGS. 11A and 11B. In these examples, the gratings are designed to direct light to the zeroth order and the second order (in FIG. 11A) and to the −1, 0 and +1 diffraction orders (FIG. 11B). Accordingly, proper selection of the pitch of the unit cells and the distance between the encoder 120 and the detector array 140 provides optical field collection including two neighboring unit cells associated with each sub-array of the detector array 140. Similarly to FIGS. 10A and 10B, FIG. 11A shows unilateral non-symmetric grating configuration and FIG. 11B shows symmetric configuration. In these configurations, the number of neighboring unit cells is two, and accordingly the number of detector elements in each sub-array of the detector array 140 is higher, and as exemplified in the figures M=6 in these examples, and may be higher. Also, the distance L is greater, to allow diffraction orders to fit the corresponding sub-arrays of the detector array.

Figure 12A:
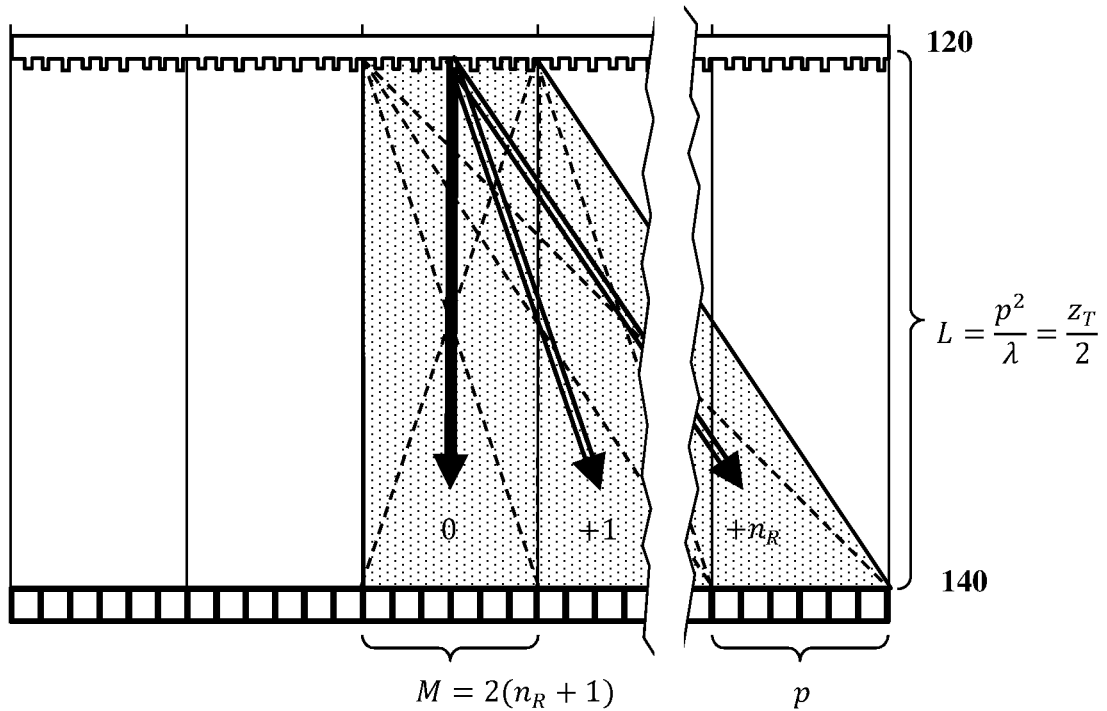
FIGS. 12A to 12C illustrate encoding using general grating providing $n_R$ neighbor unit cells collection scheme.
Figure 12B:
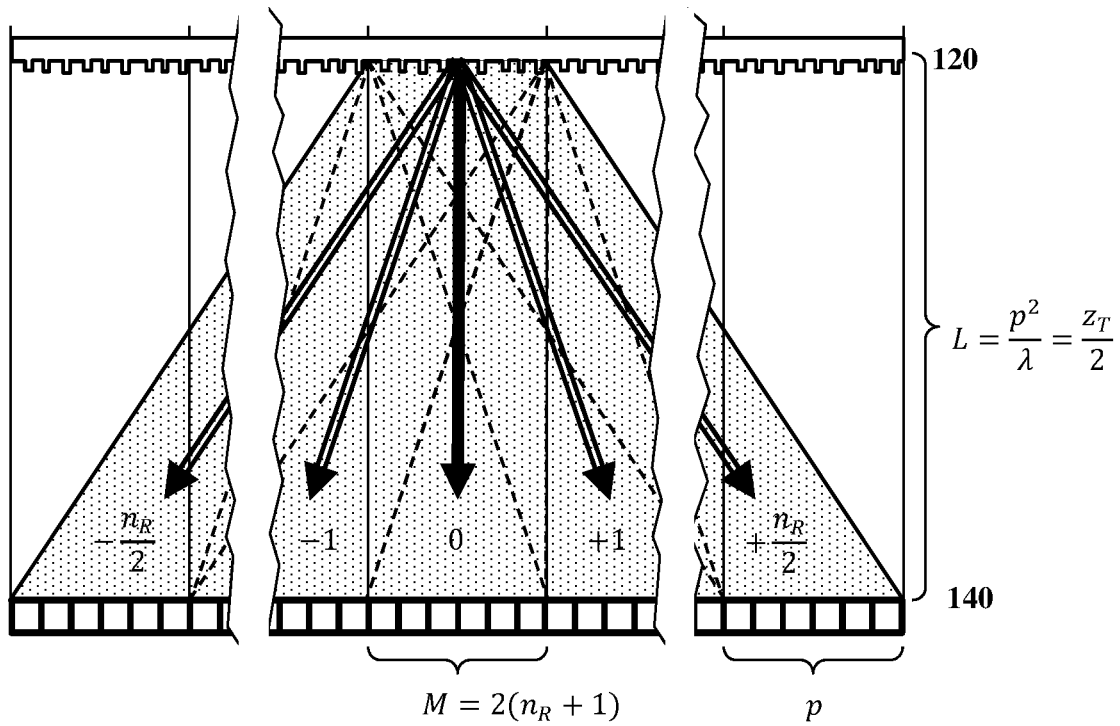
Figure 12C:
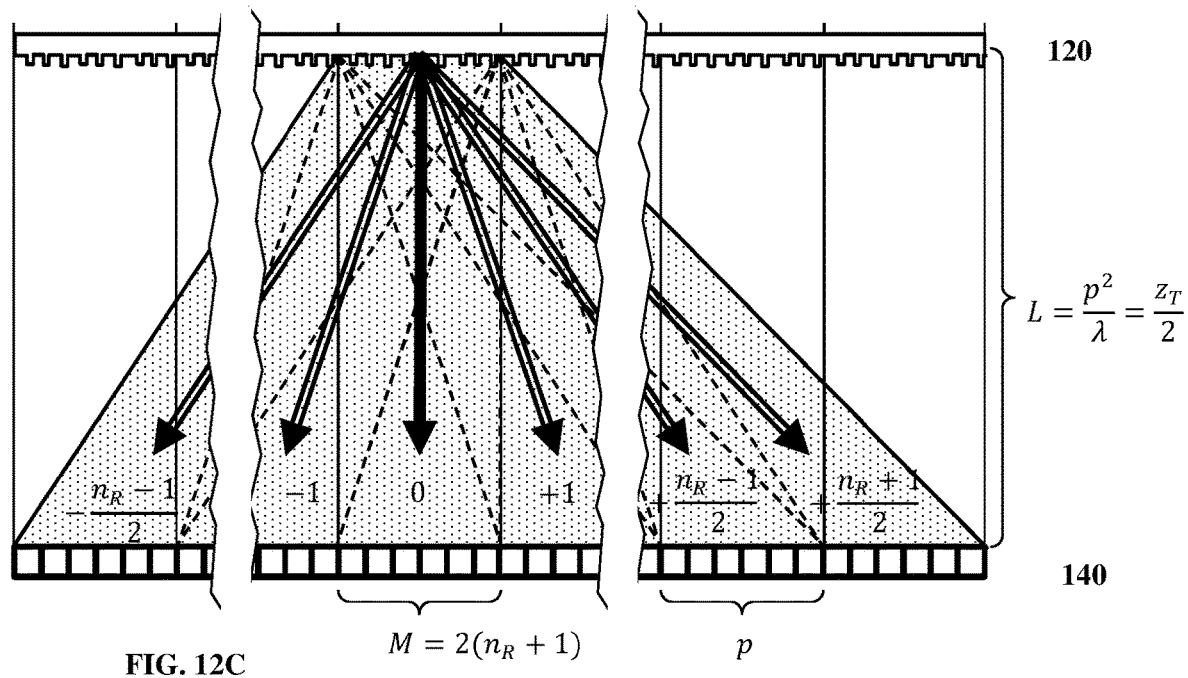

General configurations, with $n_R$ neighboring unit cells directing light to each sub-array, or each sub array receives light from $n_R$ neighboring unit cells, are illustrated in FIGS. 12A to 12C. FIG. 12A illustrates unilateral configurations, FIG. 12B illustrates a symmetrical configuration and FIG. 12C illustrates a non-symmetrical, or quasi-symmetrical configuration (generally suitable for odd value of $n_R$). In these configurations, the grating pattern of the encoder is configured to direct light toward $n_R$ diffraction orders, in addition to the zeroth order, with selected arrangement (unilateral, symmetric or quasi-symmetric). As indicated above, the detector array is preferably configured with at least M=2 ($n_R$+1) detector elements per unit cell sub-array. It should be noted that additional configurations may be used as the technique of the invention is generally not limited to number or arrangement of neighboring unit cells of the encoder associated with each sub-array of the detector array.

Figure 13A:
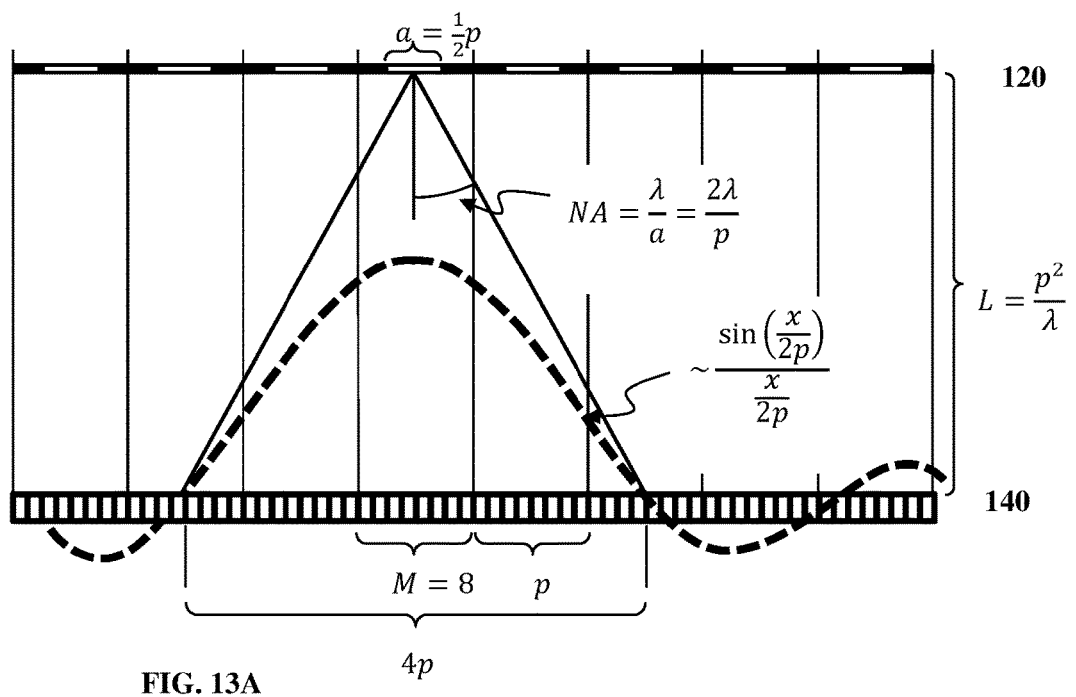
FIGS. 13A to 13C illustrate phase and/or amplitude varying encodings.
Figure 13B:
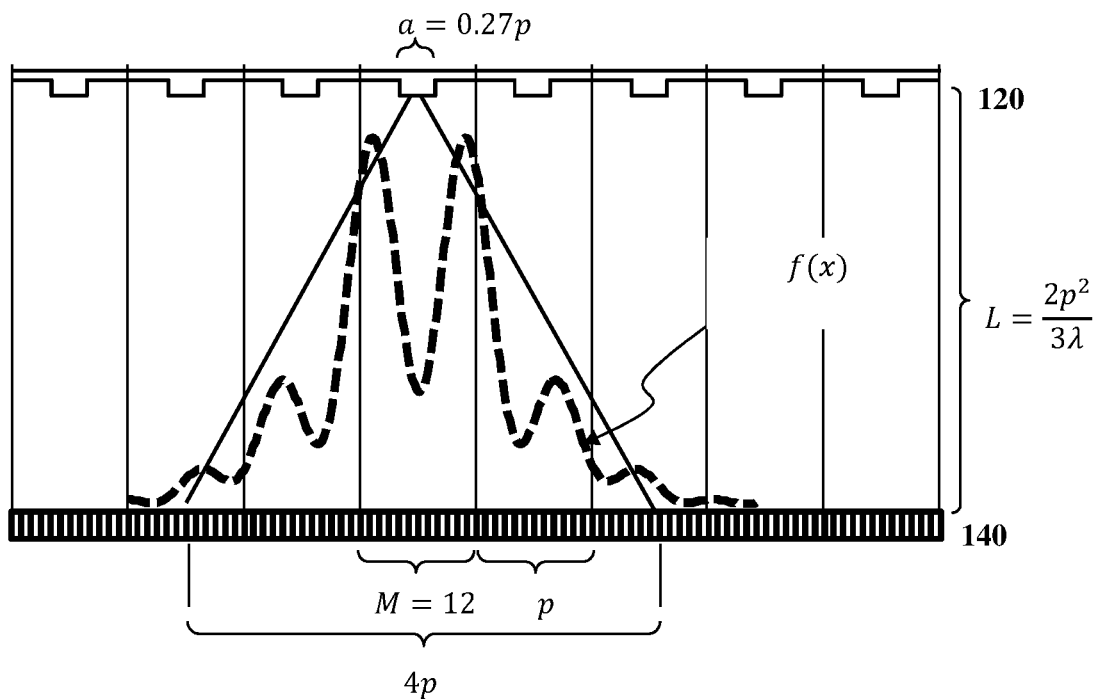
Figure 13C:
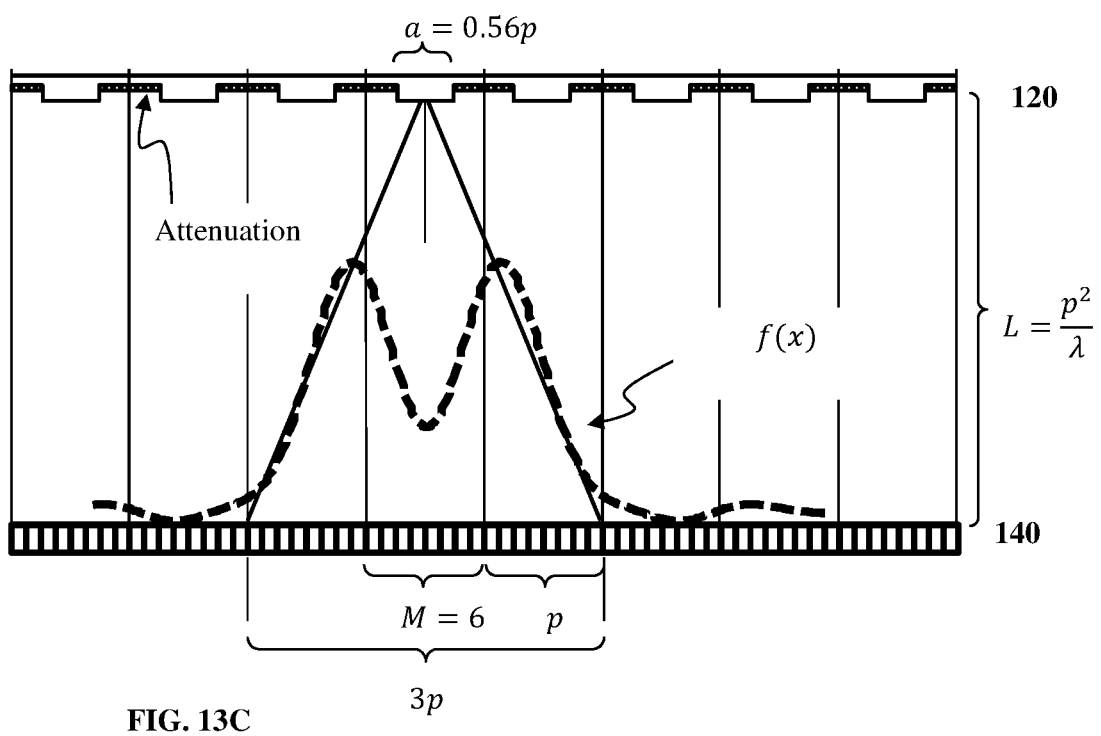

Further, the technique of the invention may be used with various patterning types, FIGS. 13A to 13C exemplify configurations of the detector system of the invention utilizing pattern formed of plurality of apertures (FIG. 13A), binary phase pattern (FIG. 13B) and phase and amplitude mask/pattern (FIG. 13C). Generally, as the encoder is periodic with respect to unit-cells thereof, it can be considered as diffraction gratings, and analyze the diffraction-orders with respect to the designs and criteria as described above. Alternatively, the optical field generated by a single unit-cell and propagating the distance L may be determined using known models of optical propagation and thus provide data about the fundamental response functions of the unit cell. Generally, the result may be similar as the grating's diffraction-order amplitudes are given by the values of the unit-cell far-field sampled at appropriate intervals.

The simplest type of mask is an aperture mask, illustrated in FIG. 13A. In this example, the aperture has a diameter of $a=\frac{1}{2}p$, providing that for a propagation distance of $L=\frac{1}{2}z_T$, the fundamental response function is approximately sinc-shaped with a spread of 4p between the first zeros on either side of the central lobe. Such span of the central lobe provides participation of three neighboring unit cells directing light to each sub-array, i.e. it defines a proximity region of four unit-cells in width, and accordingly to achieve correct sampling at this angular spread the number of detector elements in each sub-array is preferably M=8 or higher. Generally, such design is relatively robust, and the propagation distance L and aperture diameter a may be varied while maintaining performance, as long as sufficient sampling M is maintained.

A simple binary-phase mask is illustrated in FIG. 13B. In this example, the relative phase between the mask segments is $\pi$, resulting in a fundamental response function having relatively large angular spread (corresponding to higher frequencies) with respect to the number of neighboring unit cells. Accordingly, such a binary phase mask configuration preferably requires a higher sampling rate with respect to the number of neighboring unit cells directing light to each sub-array of the detector array 140. In this example, participation of 3 neighboring unit cells may be suitably sampled using M=12. Further, the distance L may typically be relatively short, and may be selected as $L=\frac{1}{3}z_T$.

A combination of amplitude and phase mask is illustrated in FIG. 13C. The example if FIG. 13C is optimized to equally diffract most of the incoming energy into the first orders −1, 0, +1. to achieve this the mask is configured with transparent portion of the mask covering 56% of the period p, and the remaining portion has a $\pi$ phase shift and an attenuator tuned to reduce the optical field by a factor of 3 (i.e. transmitting only ⅑ of the incident energy flux). Utilizing a propagation distance $L=\frac{1}{2}z_T$, provides that the fundamental response includes 2 neighboring sub-arrays and accordingly sufficient sampling can be achieved using M=6 or higher.

Figure 14A:
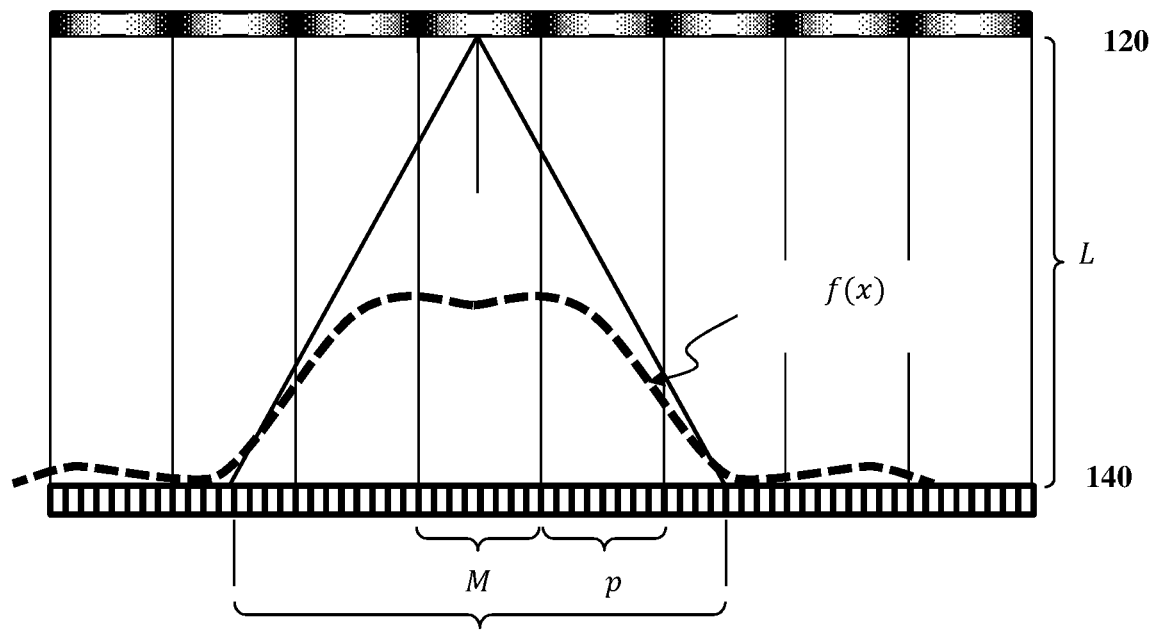
FIGS. 14A and 14B illustrate gray level amplitude and phase encodings respectively.
Figure 14B:
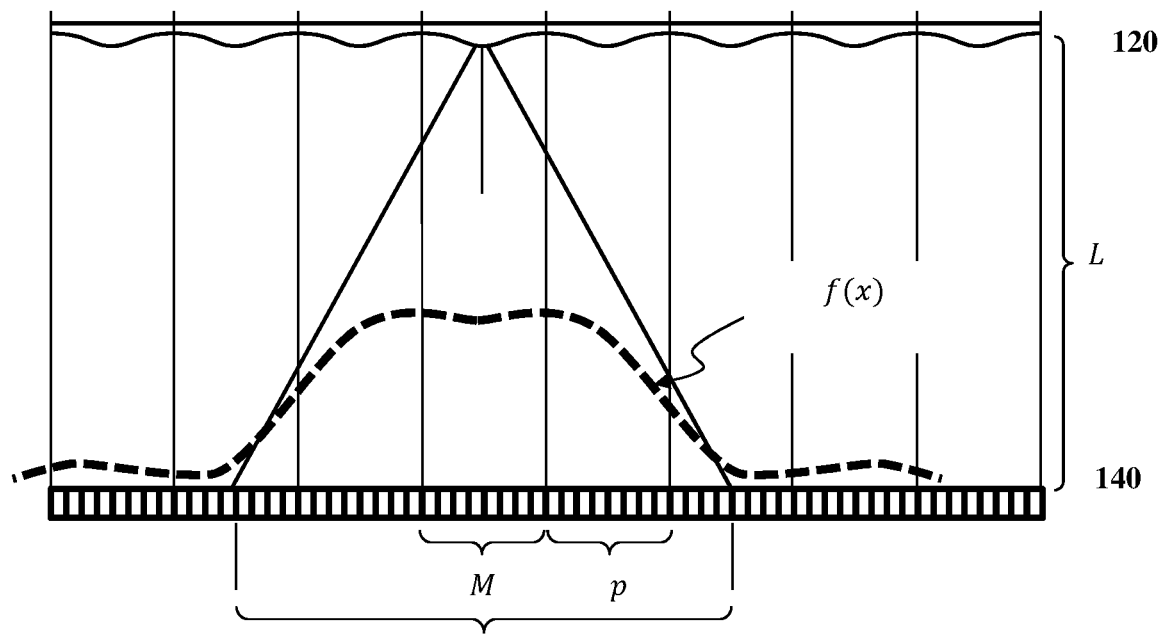

Gray level amplitude and phase masks are exemplified in FIGS. 14A and 14B respectively. Generally, the fundamental response function $f(x)$ is determined in accordance with amplitude and/or phase variation function of the encoder 120. For example, amplitude modulation with profile of $$\frac{1}{2}\left(\cos\left(\frac{2\pi x}{p}\right)+1\right)$$

may provide light propagating in 3 diffraction orders corresponding to −1, 0, +1 with an energy distribution ratio of 1:4:1. Such a design may be well sampled with M=6 and covers a proximity region span X providing $n_R$=2 along one axis, at distance L=½$z_T$. Generally, the sampling rate M in each sub-array of detector elements is selected in accordance with angular spread NA=X/2L of the fundamental response function providing $$M \geq 2\frac{Xp}{L\lambda}.$$

It should be noted that gray-level amplitude and/or phase patterns may be configured to provide generally any desired fundamental response function. Typically, the patterns may be selected such that energy reaching the side-lobes is minimized to an application-determined negligible level, while the distribution within the main-lobe matches the required span of the proximity region X. As a specific example, a Gaussian profile of the form exp(−a(x/p)²) may be selected providing $n_R$=2 with 3≤a≤7.

Additionally, a phase pattern having profile of $$\frac{\pi}{3}\cos\left(\frac{2\pi x}{p}\right)$$

may be used, directing light components into 3 diffraction orders, −1, 0, +1 with an energy distribution of approximately 3:8:3 and negligible residual energy in the higher orders. Such pattern may be selected using M=6 and L=½$z_t$ with $n_R$=2.

A combination of amplitude and phase patterning may also be used. For example, a pattern having an amplitude profile of $$\frac{2}{3}\left(\cos\left(\frac{2\pi x}{p}\right)-\frac{1}{2}\right)$$

can be achieved using amplitude variation combined with a binary π-phase mask. This configuration provides 3 diffraction orders −1, 0, +1 with equal energy distribution. Another configuration may use a modulation profile of $$\cos\left(\frac{2\pi x}{p}\right),$$

so that only the −1 and +1 diffraction orders are present, with design parameters of M=6, L=¼$z_T$ with $n_R$=1.

Additional exemplary configurations include binary phase-mask such as a Dammann-type grating, where the interface points between the 0 and π phase-shift regions are chosen to obtain a desired diffraction pattern. The pattern configuration may be determined by numerical optimization, or using commercially available masks. Alternatively or additionally, the pattern may be configured as holographic gratings.

Figure 15A:
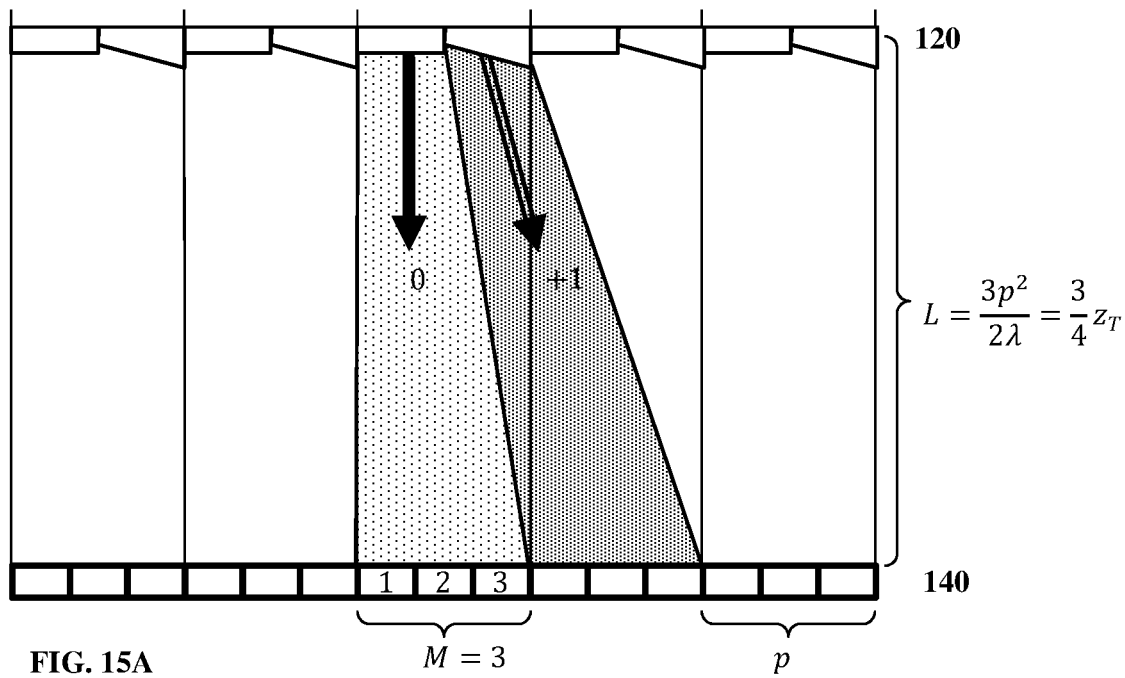
FIGS. 15A to 15D illustrate micro-prism encoding configurations.
Figure 15B:
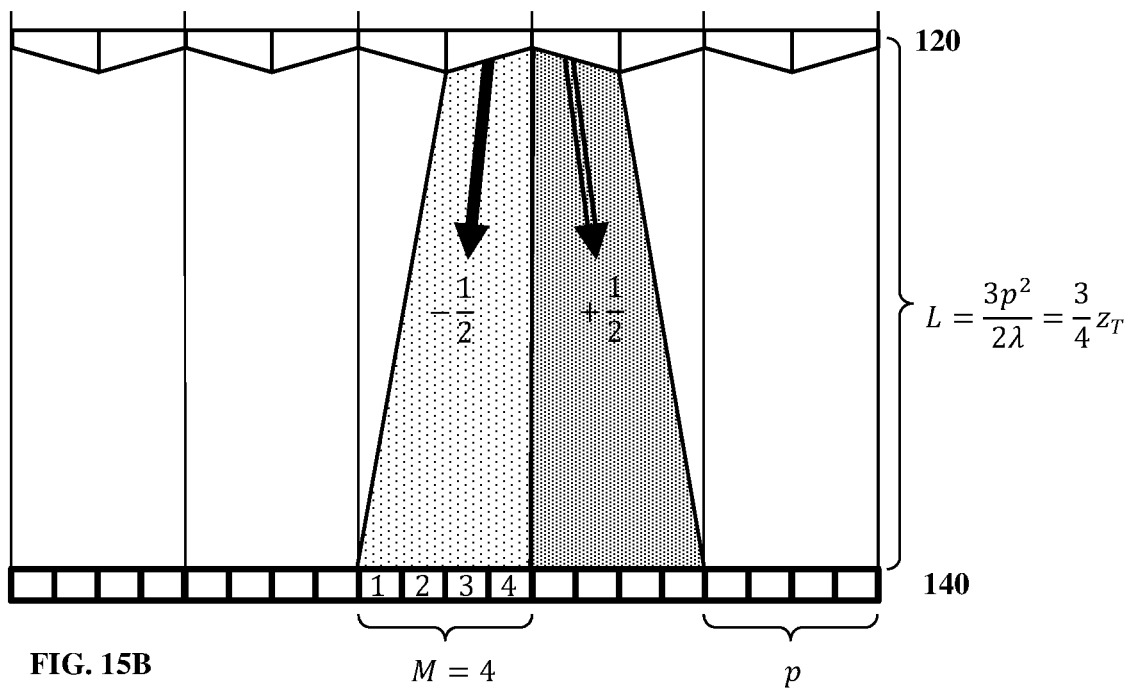
Figure 15C:
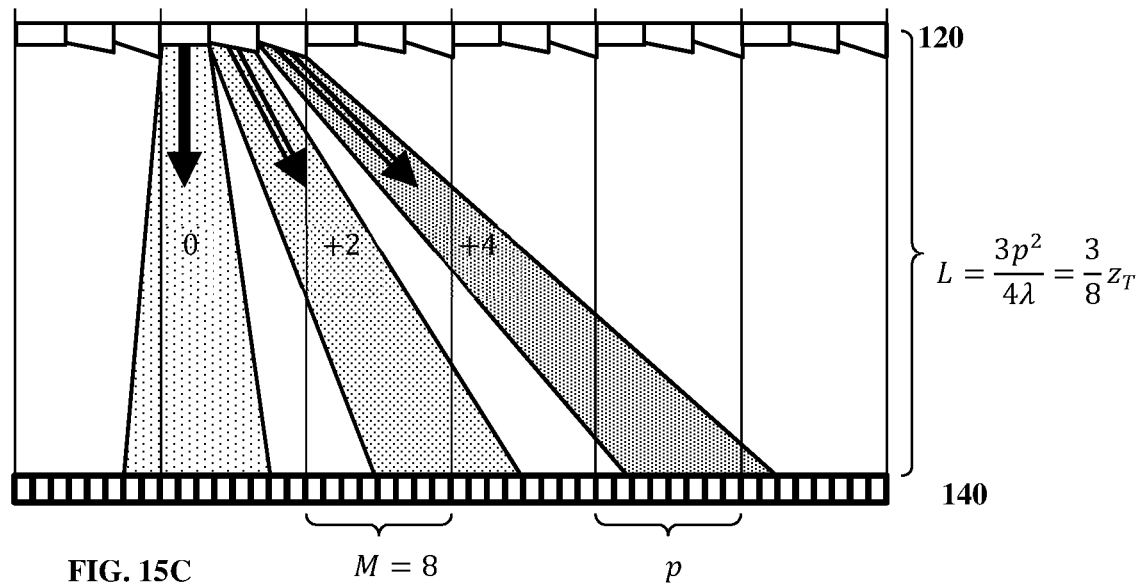
Figure 15D:
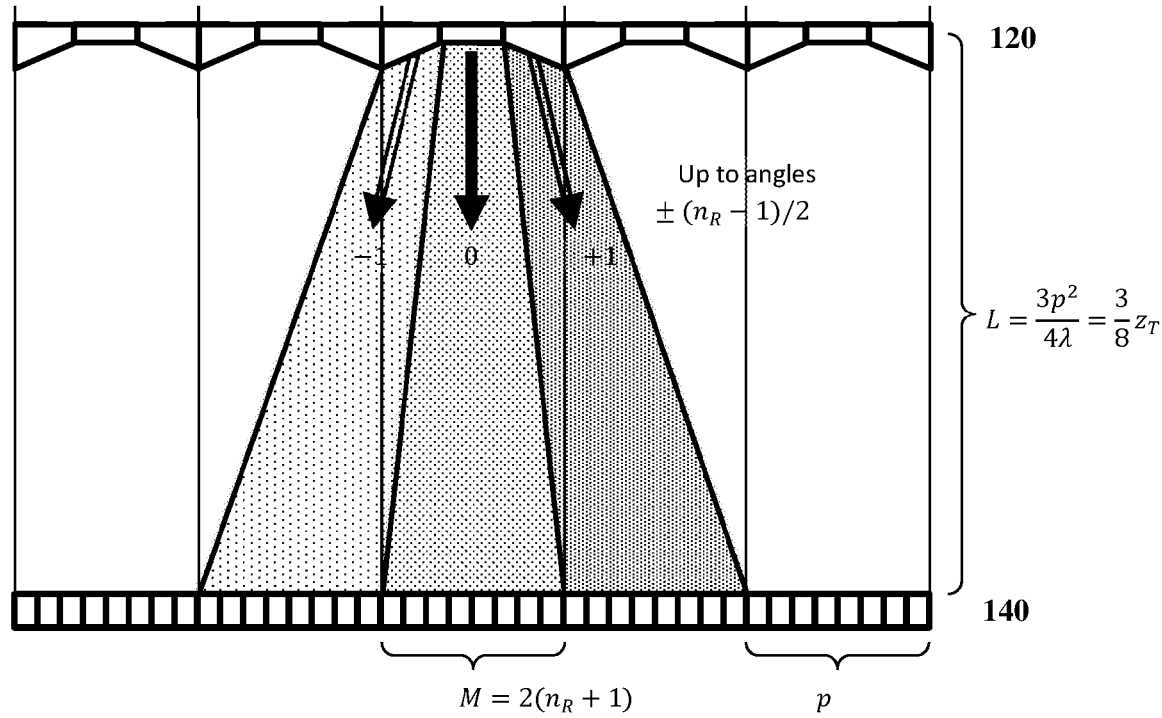

Reference is made to FIGS. 15A to 15D illustrating micro-prism type patterns of the encoder. These pattern designs utilize periodic arrays of micro-prisms selected to obtain desired fundamental response function. Generally, such micro-prisms may be combined with amplitude attenuating elements. FIG. 15A illustrates a basic micro-prism design having $n_R$=1 along one axis; FIG. 15B illustrates a symmetric design having $n_R$=1 along one axis; FIG. 15C illustrates a basic micro-prism design having $n_R$=3 along one axis; and FIG. 15D illustrates a general symmetric design. Generally, it should be noted that the micro-prisms may be of equal length/dimension, or be of different lengths and that phase and/or amplitude patterning may also be used on top of the micro-prisms.

Figure 16A:
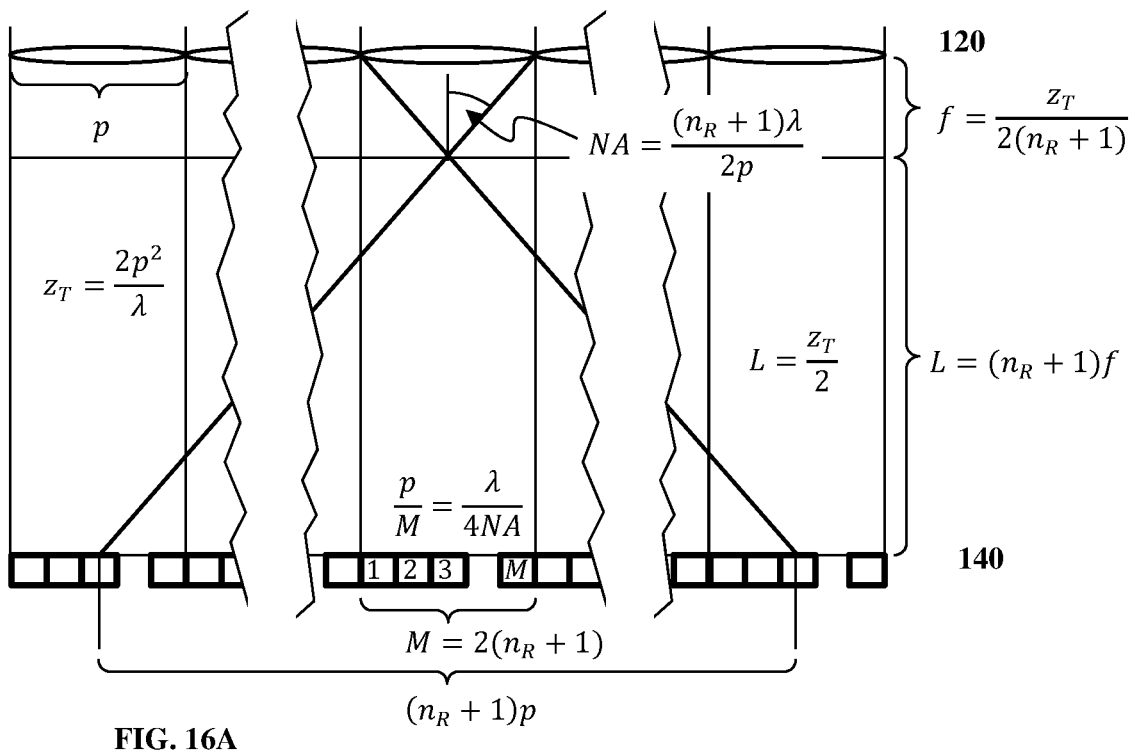
FIGS. 16A and 16B illustrated lenslets encoding configuration using convex and concave lenslets respectively.
Figure 16B:
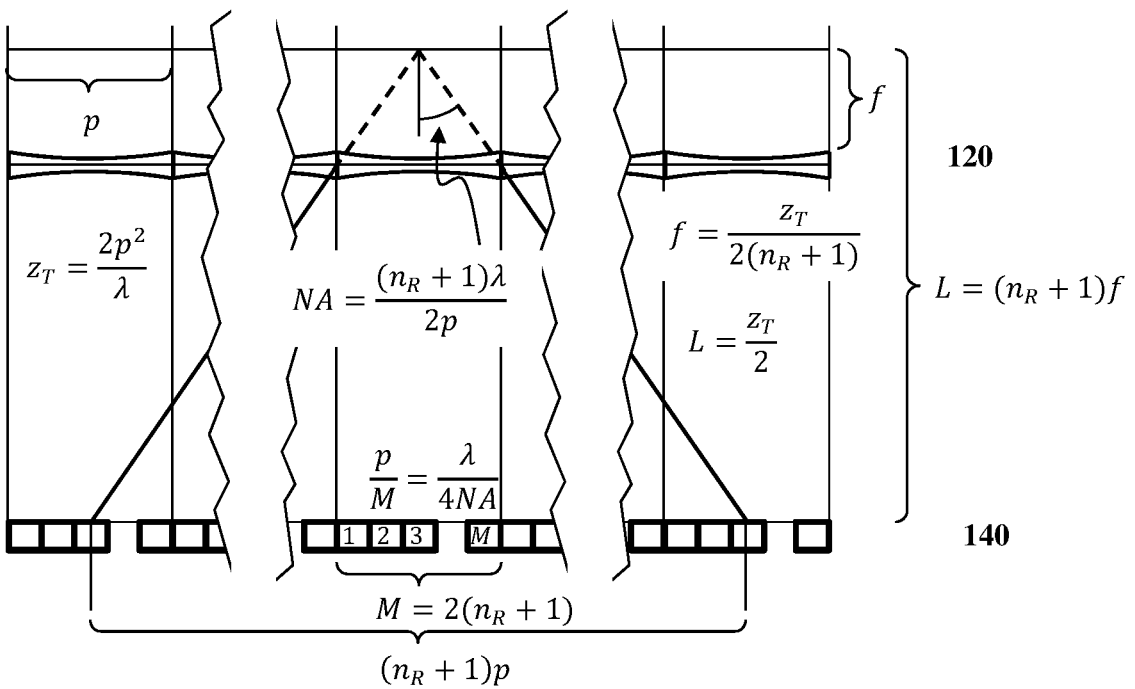

As mentioned above, the encoder may also include a lenslet array, or microlens array, this is exemplified in FIGS. 16A and 16B illustrating patterns using convex and concave lenslet arrays respectively. Generally, the lenslets are preferably configured to occupy one unit cell each, and are exemplified with general focal length of $f$ (or −$f$). For a general off-diagonal radius $n_R$ (with proximity region corresponding to the same number of participating neighboring unit cells), the expansion ratio may be selected to be about 1:($n_R$+1), enabling the use of a detector-plane proximity region with span p($n_R$+1). The focal $f$ length may be selected as ($n_R$+1)$^{-1}$ of the propagation length L=½$z_T$. The corresponding numerical aperture $$NA = \frac{p}{2f}$$

requires at least M=2($n_R$+1) detector pixels per unit cell, so that the focal length and NA may also be expressed as $$f = \frac{z_T}{M} \text{ and } NA = \frac{M\lambda}{4p}.$$

Generally, from the focal point of the lenses, the light is allowed to propagate a further distance of L=½$z_T$ before reaching the detector pixels. The ratio L/$f$ determines the geometric optics magnification factor between the input lenslet plane and the detector plane. Each of the lenslets creates a patch of light that has a diameter of pL/$f$. For $f$<L this results in patches that overlap. Each such patch of light is the geometric optics description of the fundamental response function, and its extents correspond to the proximity region of each unit cell. It should be noted that the design of the lenslet array and corresponding fundamental response functions in the contexts of the present invention may utilize a simple geometric optics design. On the other hand, the lenslet array may be considered as an example of gray-scale phase pattern having parabolic phase variation within each unit cell, and as such, be treated as a diffraction grating.

Figure 17:
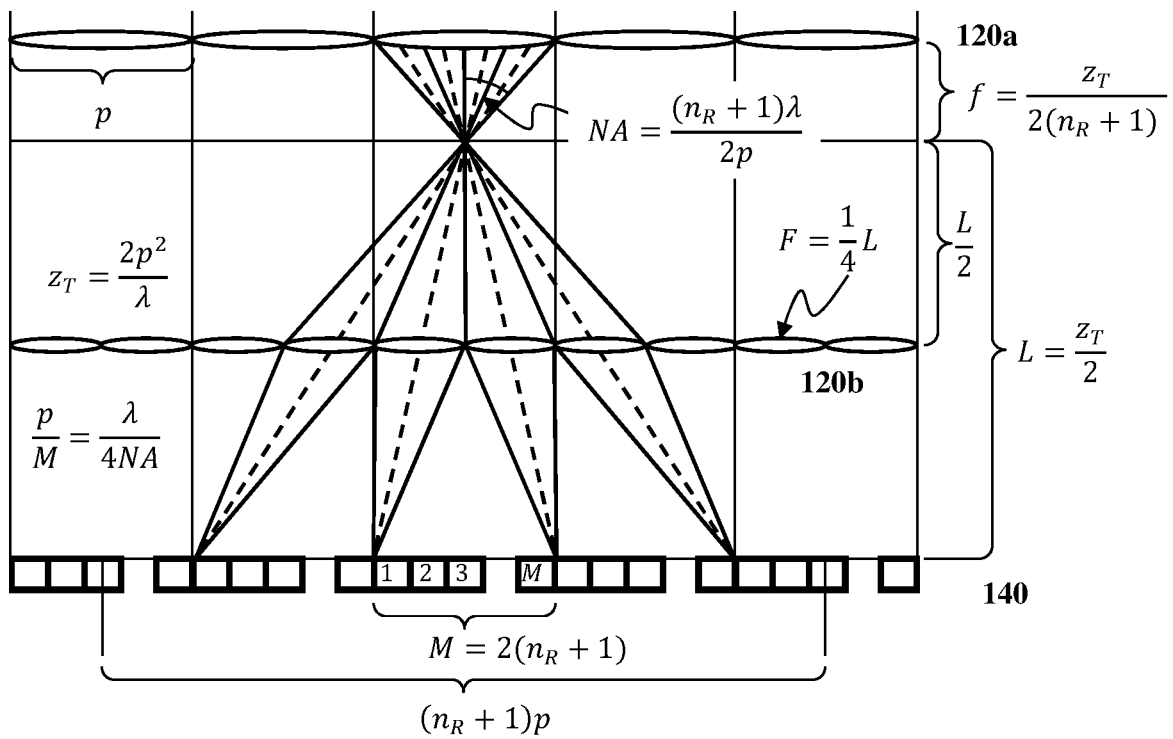
FIG. 17 illustrates encoder including two or more layers of lenslets encoding configurations.

Generally, the present technique may utilize multi-layer encoder configurations. As described above. Such multi-layer configuration may be based on two or more different patterns of the encoder 120. Alternatively or additionally, the encoder may include two or more layers that are separated between them along general direction of propagation of collected light. One such multi-layer configuration is exemplified in FIG. 17 illustrating a detection system including a first encoder layer 120a, second encoder layer 120b and a detector array 140. In this example, the layers of the encoder are configured as lenslet array layers and are arranged such that lenslets of the second layer 120b image the focal points of lenslets of the first layer 120a onto the detector array. In this configuration, the number of neighboring unit cells directing light components onto a sub-array of detector elements is typically determined by selection of the focal lengths and numerical apertures of the lenslets. More specifically, the greater the numerical aperture of the lenslets of layer 120a, the greater the number of neighboring unit cells directing light to the same sub-array of detector elements. Additionally, multi-layer configurations may utilize aperture based layer combined with lenslets array or other such multi-layer combinations.

Figure 18:
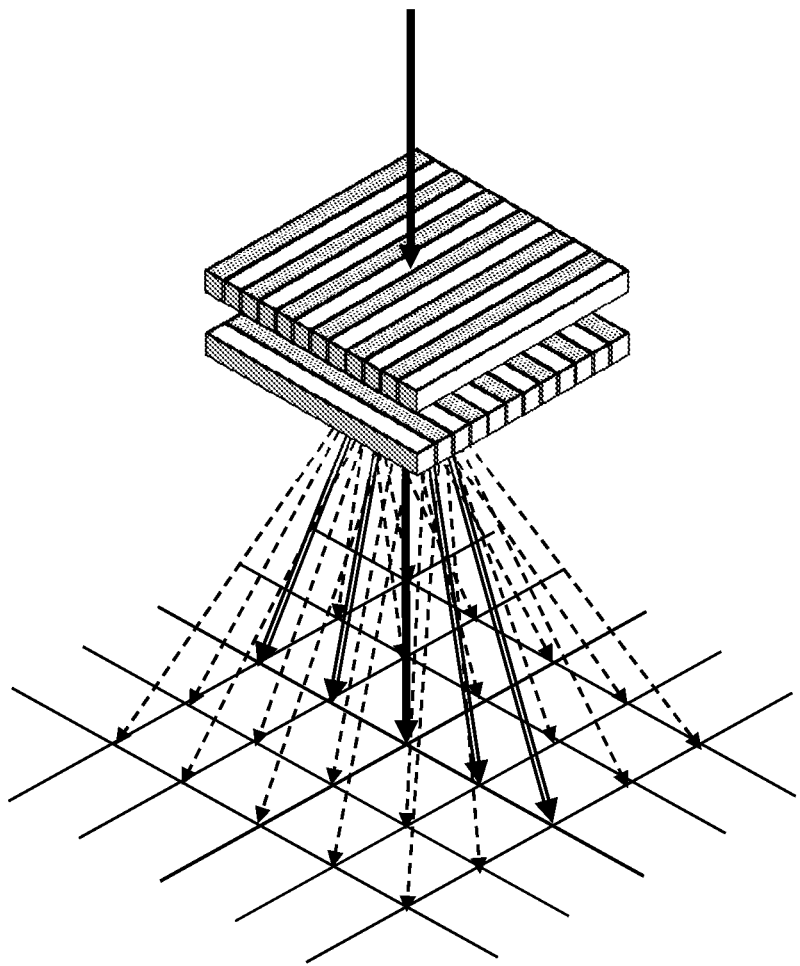
FIG. 18 illustrates simple expansion to two-dimension of light collection.
Figure 19A:
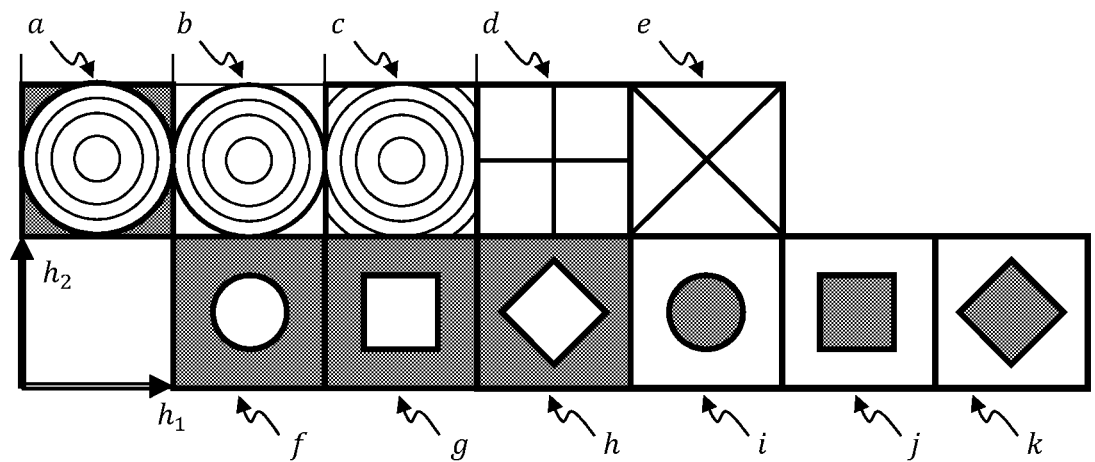
FIGS. 19A and 19B illustrate different unit cell encodings in two-dimensions.
Figure 19B:
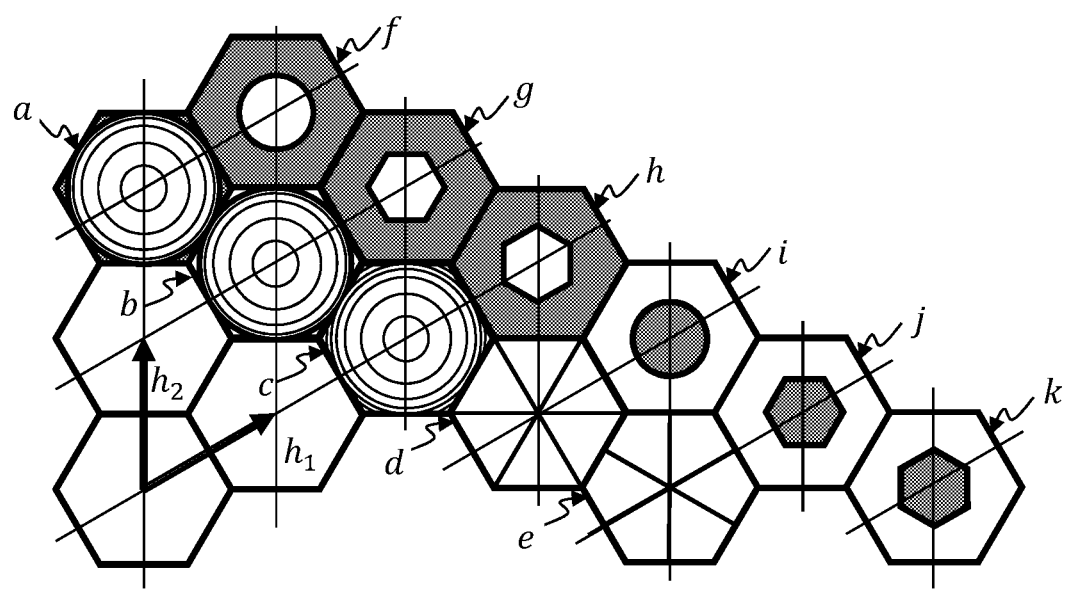

As indicated above, the above described examples are illustrated in one-dimension for simplicity. FIG. 18 illustrates a use of two one-dimension patterns to provide a two-dimensional encoder by aligning the two patterns with an angle between them. Additionally, FIGS. 19A and 19B exemplify some unit cell designs using rectangular and hexagonal periodic pattern respectively.

Generally, unit cell designs a-c in these figures are associated with round lenslets embedded in square/hexagonal grid, the lenslets are depicted as concentric circles describing their topographical contour. In design a the dead-space surrounding the lenslets is masked, design b leaves this space open and in design c the lenslets are extended to fill the entire unit-cell. All of these lenslet designs can be extended to other elements with circular symmetry, e.g. holographic lenses, Fresnel lenses, aspherical elements, etc.

Designs d and e illustrate micro-prisms configurations embedded in a unit cell. In design d the micro-prisms are arranged in a plus (+) configuration, while in design e they are arranged as an ex (X) configuration. In hexagonal periodic pattern, the micro-prism varies in similar pattern with respect to sides and angles of the unit cell.

Finally, designs f-k illustrate for binary masks. Designs f and i utilize a mask with circular symmetry, in positive and negative versions. Designs g, h, j and k are positive and negative versions that retain the square symmetry, or hexagonal symmetry. In designs g and j the mask is oriented parallel to the unit cell, while in h and k the mask is rotated by 45 (or 30 for hexagonal configuration) degrees.

Figure 20:
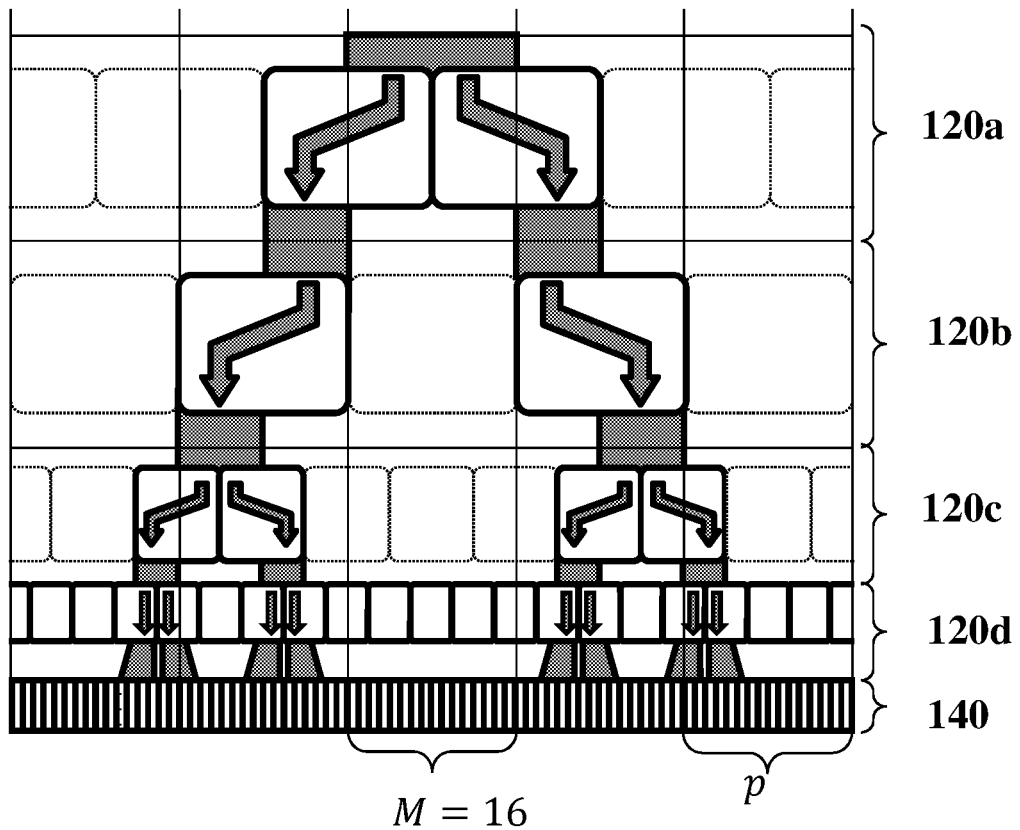
FIG. 20 illustrates a cascade type encoder.

Referring back to the multi-layer configuration illustrated in FIG. 17, some additional encoder configurations may utilize a cascade-type encoder including a plurality of light directing, splitting, flipping elements and other light directing elements. Such a cascade-type configuration is exemplified in FIG. 20 illustrating a cascade-type encoder including first splitting layer 120a, flipping layer 120b, second splitting layer 120c and mixing layer 120d, all directing collected light/radiation to be collected and detected by a detector array 140.

The cascade-type encoder as exemplified herein is based on a cascade of optical layers configured for directing collected light components in a path including selected level of splitting forming a tree-like propagation path for light components impinging on each unit cell. The trees of adjacent unit-cells are preferably configured such that output plane of the cascade-tree contains multiple samples or replications of the light components impinging on the unit-cells. The replications may be arranged so that for any pair of unit-cells within the off-diagonal radius $n_R$ (neighboring unit cells), there are at least two samples that are nearest neighbors.

Generally, the cascade tree optical elements may be based on geometric optics, and specifically on lenslet arrays. Generally, splitter layers 120a and 120c include optical elements configured for splitting light components impinging on input of the splitter elements and direct them to paths along neighboring splitting elements. When the splitting elements are configured with regular periodicity 120a, this corresponded to directing light from one unit cell to neighboring unit cells. Other layers 120c may be configured with double periodicity (or more) and accordingly, the splitting elements direct light components accordingly. Flipping layers 120b are configured to direct light components to a single neighboring region (in accordance with pitch of the layer 120b) and mixing layers 120d effectively relay light components.

As indicated above, the different layers of the cascade encoder may be configured from lenslet arrays, wherein each layer may be a single lenslet layer or two or more lenslet layers. Typically, each cascade layer is configured to relay the optical field from its input plane (top) to its output plane (bottom) such that within each relay unit the optical field's transverse orientation is flipped. Further, it should be noted that for sufficient sampling rate, the number of sensor cells may be determined by pitch size of the layers in the cascade configuration combined with number of neighboring unit cells directing light components to the same sub-array of the detector array 140.

Figure 21:
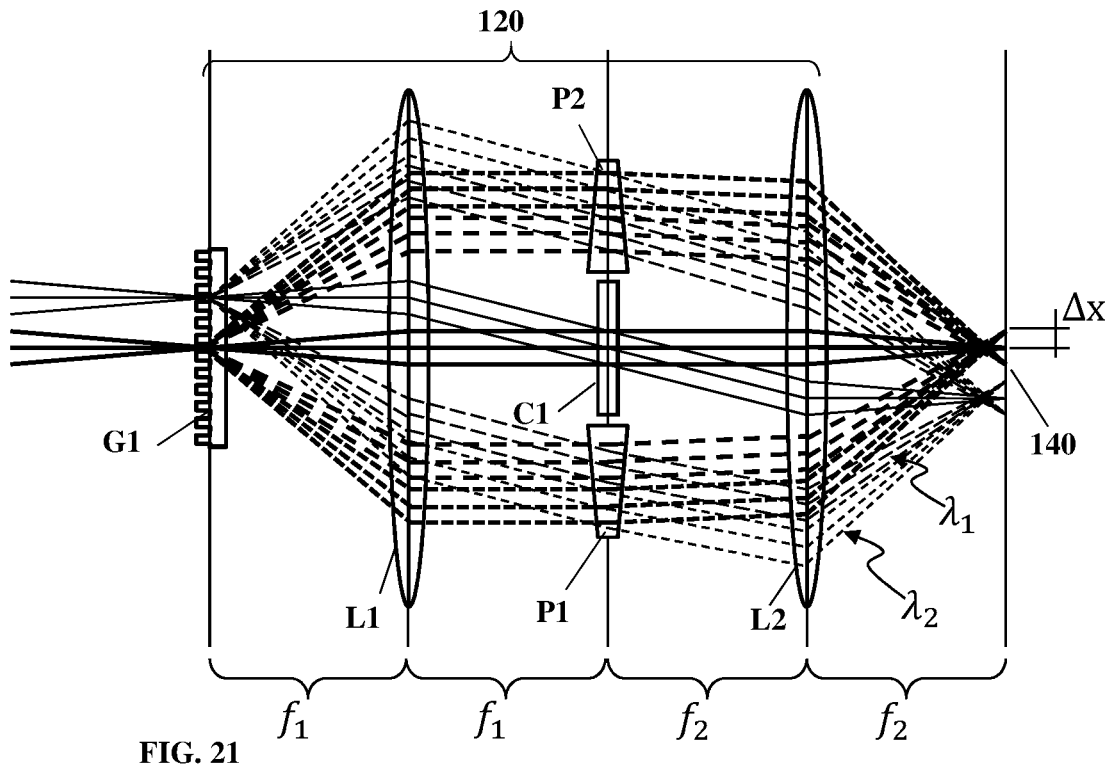
FIG. 21 illustrates encoder configured for use with broadband optical radiation.
Figure 22A:
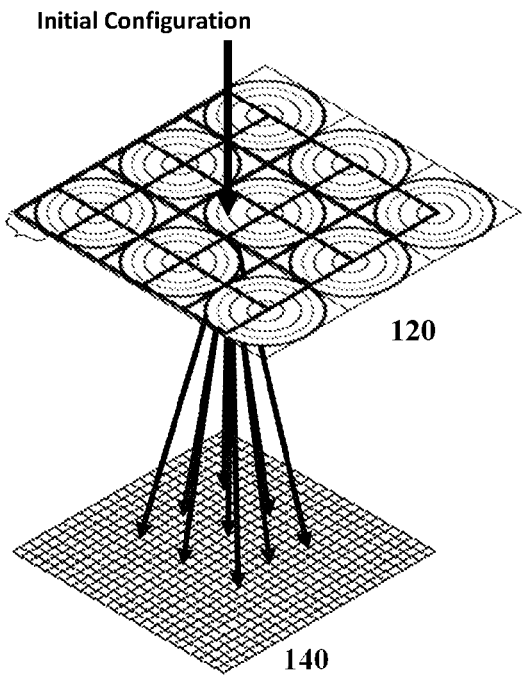
FIGS. 22A to 22D illustrates encoder configuration with shifting encoding according to some embodiments of the invention.
Figure 22B:
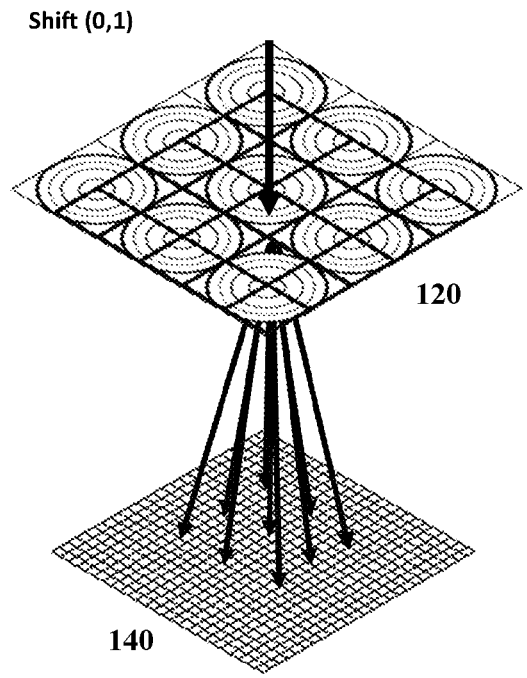
Figure 22C:
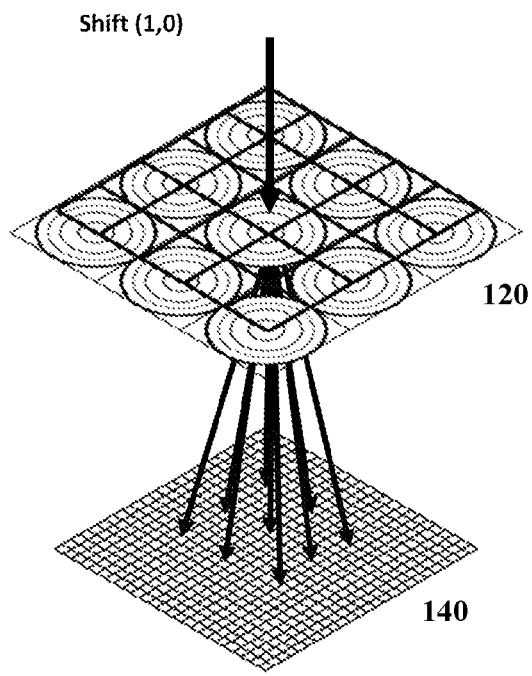
Figure 22D:
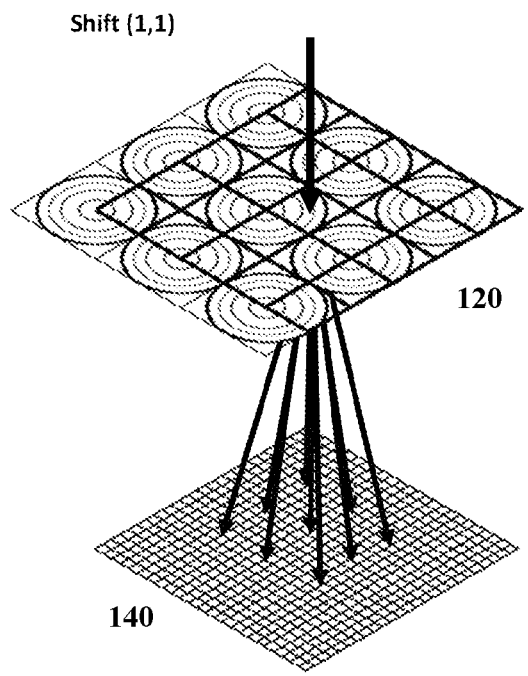

Reference is made to FIG. 21 illustrating an encoder configuration for use with polychromatic/broad-band illumination. Such polychromatic detection may be used for applications where it is desirable for a common fundamental response and/or set of intensity basis functions to be similar for wavelengths covering a wide range. This configuration is based on an encoder 120 including an initial grating element G1 configured for splitting light into several diffraction orders including chromatic variations (orders −1, 0 and +1 are illustrated as an example), a two lens, 4f relay arrangement including lenses L1 and L2, and prism units P1 and P2 located at the aperture plane and configured to vary optical path of different wavelengths to direct light components of all wavelengths within a selected wavelength range onto the detector array while introducing different lateral shifts $\Delta x$ for each diffraction order. These lateral shifts are designed such that each diffraction order (sub-channel) is properly displaced with regards to the desired size of the encoder's unit cells, providing a desired proximity region and fundamental response in accordance design principles described above. Accordingly, light components of wavelengths $\lambda_1$ and $\lambda_2$ are illustrated to merge again at the detector plane.

Generally, in this configuration the detector array 140 is placed on the back focal plane of the relay arrangement and the desired lateral shifts $\Delta x$ are obtained by the prism units P1 and P2 near the system's pupil plane. This configuration provides that the different wavelengths belonging to a certain diffraction-order (sub-channel) of the input field meet at the same point, with each diffraction-order (sub-channel) having a specified lateral shift. It should be noted that zeroth order of diffraction doesn't have any chromatic dispersion and thus need not be corrected. In some configurations, a compensator C1 may be provided in optical path of zeroth diffraction order (sub-channel) adjusting optical path length to matches that of the other diffraction orders that are modulated by their respective prisms P1 and P2 in this example. It should also be noted that it is assumed that lenses L1 and L2 are effectively free of chromatic dispersion, and that if not, any such effects can be compensated by choice of prism P1 and P2 (and possibly compensator C1) material and design.

Additionally, this configuration may also utilize a Fourier modulator (not specifically shown), located near the aperture plane and configured to provide additional control of relative phase and/or amplitude of light components of different wavelengths and/or diffraction orders (sub-channels). The Fourier modulator can also be used to block undesirable diffraction orders from the grating element.

Further, the detector array may be configured as a spectrally sensitive detector, e.g. an RGB Bayer detector array, or other (hyper-)spectrally sensitive pixel arrangements. The use of a spectrally sensitive detector is relevant for the broad-band designs, and as such, it allows each wavelength range to have a corresponding fundamental response and/or intensity basis functions, thereby possibly extending the total allowable wavelength range acceptable by the device. Additionally, a spectrally sensitive detector may also be applicable for extending the spectral range of the detector system configurations utilizing encoder configurations as described above.

Additional reference is made to FIGS. 22A to 22D illustrating an encoder configuration utilizing lenslets array having pitch size that is larger than the desired unit cell (associated with geometrical resolution). This configuration may typically be used in accordance with the detector system configuration exemplified in FIG. 8C utilizing temporally varying coding technique. As shown, the lenslet array 120 includes lenslets having period larger than the desired unit cell. Accordingly, the pattern is shifted between capture instances by pitch size of the desired unit cell. As shown, in FIG. 22A the array is aligned at (0,0), after first capture the array 120 is moved to alignment (0,1) in FIG. 22B, the array is further moved to alignment (1,0) in FIG. 22C and to alignment (1,1) in FIG. 22D. It should be noted that additional shifts may be used providing a 3×3 configuration utilizing 9 shifted copies of the lenslet array or more. The total intensity maps collected after such four instances are used for processing in accordance with the above described technique. It should also be noted that the order of the instances may be determined arbitrarily and does not play a role on the processing according to the present technique. In another embodiment, such multiple configurations (similar to those illustrated in FIGS. 22A to 22D) may be used in a parallel architecture as exemplified in FIG. 8B.

Figure 23A:
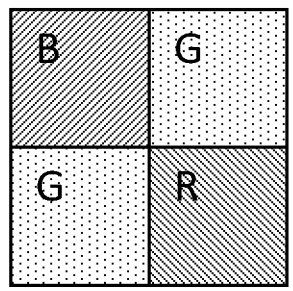
FIGS. 23A to 23D exemplify cell clustering enabling polychromatic, multiple unit-cell orientations and/or polarization sensitive coherence camera according to some embodiments of the invention.
Figure 23B:
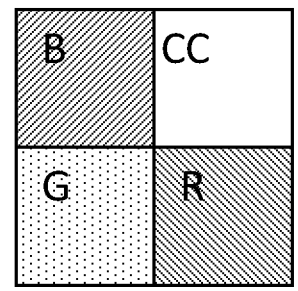
Figure 23C:
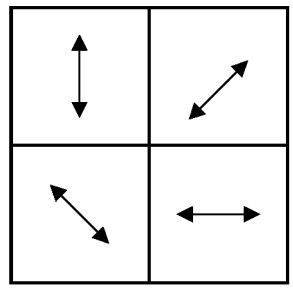
Figure 23D:
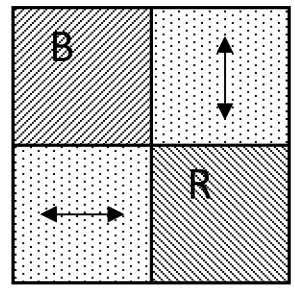

Reference is made to FIGS. 23A to 23D exemplifying unit cell clustering with respect to wavelength, polarization filtering, and/or unit-cells with different modulation and/or orientation (the latter relevant for unit cells with 1D encoder patterning and corresponding 1D proximity region with a reduced number of sensor cells). FIG. 23A exemplifies a Bayer type cluster including two Green transmitting cells, red transmitting cell and blue transmitting cell; FIG. 23B exemplifies arrangement of three RGB conventional intensity detection cells and a CC phase and/or coherence detection cell as described herein; FIG. 23C exemplifies cells with polarization filters of varying orientations and/or 1D oriented encoder cells; and FIG. 23D exemplifies combined arrangement of wavelength and polarization cells and/or 1D oriented encoder cells.

Generally, as mentioned above, clustering cells may be used for providing imaging with increase range of information, e.g. polychromatic imaging. Each cluster is generally considered as unit cell. However, each cell of the cluster is unit cell by itself and shares sub-channels with corresponding cells of neighboring clusters. Further, cells of the cluster may vary between them in spectral ranges, polarization orientations, be associated with different basis sets, sizes, encoder types, encoder orientations, etc. Selection of cell clustering may be used for enhancing depth or layers of collected data increasing dynamic range of phase/coherence imaging and/or provide additional imaging layers. For example, variation of encoder type and/or selection of basis sets enables reconstruction of phase and/or coherence data based on several parameters to optimize accuracy and sensitivity of detection.

Thus, the present technique provides a detector system and corresponding method for determining data indicative of intensity, phase and coherence of collected light. The technique of the present invention is suitable for detecting phase and coherence of light arriving from a given location, while requiring not control of illumination or inspection of the sample from additional direction. Those skilled in the art will readily appreciate that various modifications and changes can be applied to the embodiments of the invention as hereinbefore described without departing from its scope defined in and by the appended claims.

The invention claimed is:

1. An optical detection system, comprising:
an encoder having a plurality of similar unit cells; and
an array of sensor cells located at a distance downstream of said unit cells with respect to a general direction of propagation of input light through the optical detection system;
wherein said array of sensor cells defines a plurality of sub-array unit cells, each of the plurality of sub-array unit cells corresponding to a unit cell of said plurality of similar unit cells of the encoder, and each of the plurality of sub-array unit cells comprising a predetermined number M of sensor elements;
wherein said encoder is configured to apply predetermined modulation to input light collected by the optical detection system, such that each of the plurality of similar unit cells of said encoder expands a portion of the collected input light incident thereon onto one of the plurality of sub-array unit cells corresponding therewith and one or more neighboring sub-array unit cells within a predetermined proximity region; and
wherein said predetermined number M is determined in accordance with a predetermined number of sub-arrays unit cells within the predetermined proximity region.

2. The optical detection system of claim 1, wherein said predetermined number M of sensor elements of the plurality of sub-array unit cells is selected to satisfy a condition that $(M \geq 2n_R+1)$, where $n_R$ is said predetermined number of neighboring sub-arrays unit cells within the predetermined proximity region.

3. The optical detection system of claim 1, wherein said predetermined number M of sensor elements of the plurality of sub-array unit cells is selected in accordance with predetermined number of coherence matrix basis functions selected for use in reconstruction of mutual coherence information of the collected input field.

4. The optical detection system of claim 1, wherein an arrangement of said plurality of unit similar cells of the encoder defines a discretized unit measure of the collected light, a physical dimension of said unit cell of the encoder is defined by predetermined requirements with respect to a diffraction limited spot of light collected by the optical detection system.

5. The optical detection system of claim 1, wherein said encoder is configured to apply predetermined modulation to input light within a predetermined wavelength range such a modulation functions thereof being substantially similar for a selected wavelength range.

6. The optical detection system of claim 1, wherein said encoder is configured to apply one or more predetermined modulations to input light within a set of one or more wavelength ranges that said encoder defines a modulation function for each wavelength range within said set.

7. The optical detection system of claim 1, wherein said array of sensor cells comprises sensor cells configured for detecting light intensity of two or more wavelength ranges separately.

8. The optical detection system of claim 1, further comprising a control unit configured and operable for receiving input data collected by the array of sensor cells and processing said input data in accordance with data about modulation function of said encoder to determine data indicative of mutual coherence of input light collected by the encoder.

9. The optical detection system of claim 8, wherein said control unit is configured and operable for determining, in accordance with pre-provided data about modulation function of said encoder, a set of coefficients providing intensity patterns associated with data collected by the array of sensor cells, and for utilizing said set of coefficients to determine mutual coherence of input light collected by the encoder being an algebraic sum of predetermined coherence basis functions having said set of coefficients.

10. The optical detection system of claim 8, wherein said control unit comprises a processing utility, storage utility and input port for receiving data about collected intensity map from the array of sensor cells; said storage utility is pre-loaded with data indicative of modulation function of light components passing through one or more unit cells of the encoder; said processing utility is configured and operable for receiving said data about collected intensity map and for processing said data in accordance with said data about modulation function of light components passing through one or more unit cell of the encoder for determining data about coherence matrix of collected light.

11. The optical detection system of claim 8, wherein said data about modulation function of said encoder comprises a set of wavelength modulation functions associated with a corresponding set of selected wavelength ranges differently modulated by said encoder.

12. The optical detection system of claim 1, wherein said encoder comprises at least one of a micro lens array, a micro-prism array grating, or a phase mask; having said selected periodicity.

13. The optical detection system of claim 1, wherein said encoder comprises two or more layers, each of the two or more layers comprises a periodic pattern configured for affecting light components passing therethrough, said two or more layers being separated between them a predetermined distance along general direction of propagation of input light through the system.

14. The optical detector system of claim 1, further comprising a plurality of a predetermined number of encoders having selected patterns between them and wherein said array of sensor cells being configured for separately collecting optical radiation transmitted through said plurality of encoders; wherein said plurality of encoders being arranged for collecting a plurality of replications of input optical field.

15. The optical detection system of claim 14, wherein pitch periodicities of said plurality of encoders are integer multiples of a predetermined periodicity defining arrangement of the plurality of unit-cells, said plurality of encoders being configured so that patterns of different encoders are shifted between them with respect to collected optical field in fractions of said predetermined periodicity, such that a cumulative pattern of said plurality of encoders matches said predetermined periodicity defining the arrangement of unit cells.

16. The optical detector system of claim 1, further comprising a plurality of a predetermined number of encoders having selected different propagation distances to corresponding arrays of sensor cells, and wherein said corresponding arrays of sensor cells being configured for separately collecting optical radiation transmitted through said plurality of encoders; wherein said plurality of encoders being arranged for collecting a plurality of replications of input optical field.

17. The optical detector system of claim 1, wherein said encoder being configured for temporally varying at least one of pattern of said encoder and propagation distance from encoder to the array of sensor cells.

18. The optical detection system of claim 17, wherein said encoder carrying a periodic pattern having a pitch periodicity being an integer multiple of predetermined pitch periodicity defining arrangement of the plurality of unit-cells, said encoder being configured for temporally varying pattern thereof by shifting pattern thereof in fractions of said pitch periodicity, wherein said fractions match said predetermined pitch periodicity of the unit cells.

19. A method for use in optical detection, the method comprising:
collecting input optical radiation though an encoder at a collection plane and applying to the collected input optical radiation a periodic modulation configured of a plurality of similar unit cells, each having a predetermined modulation function expanding at least a portion of the optical radiation impinging on the unit cell to a downstream predetermined proximity region, wherein the predetermined proximity region comprises one ore more sub-array unit cells associated with neighboring unit cells of the encoder;
providing an array of sensor cells at a selected distance from said collection plane, said array of sensor cells is configured with cell geometry and arrangement providing a plurality of sub-array unit cells each comprising a predetermined number M of sensor cells and corresponding with unit cell of the encoder while being configured for collection of light components associated with one or more of said predetermined number of neighboring unit cells determined in accordance with said proximity region, and generating intensity map associated with output of said array of sensor cells in response to collected optical radiation;
processing said intensity map in accordance with data about said predetermined modulation function for determining a mutual coherence function of the collection light.

20. The method of claim 19, wherein said processing comprises obtaining pre-stored data indicative of said modulation function in the form of a set of intensity basis functions, associated with a corresponding set of coherence basis functions, and determining a set of coefficients connecting weighted sum of said set of intensity basis functions with said intensity map, and determining said mutual coherence matrix in accordance with said set of coefficients and said set of coherence basis functions.

* * * * *